(12) United States Patent
Oh et al.

(10) Patent No.: US 9,878,246 B2
(45) Date of Patent: Jan. 30, 2018

(54) METHOD AND DEVICE FOR CONTROLLING A DISPLAY DEVICE

(71) Applicant: SINGAPORE AIRLINES LIMITED, Singapore (SG)

(72) Inventors: Eng Seng Oh, Singapore (SG); Alexandra Williams, Wakeley (AU)

(73) Assignee: SINGAPORE AIRLINES LIMITED, Singapore (SG)

( * ) Notice: Subject to any disclaimer, the term of this patent is extended or adjusted under 35 U.S.C. 154(b) by 101 days.

(21) Appl. No.: 14/414,472

(22) PCT Filed: Jul. 5, 2013

(86) PCT No.: PCT/SG2013/000281
§ 371 (c)(1),
(2) Date: Jan. 13, 2015

(87) PCT Pub. No.: WO2014/011116
PCT Pub. Date: Jan. 16, 2014

(65) Prior Publication Data
US 2015/0222947 A1    Aug. 6, 2015

(30) Foreign Application Priority Data

Jul. 13, 2012 (AU) .............................. 2012903009
Aug. 21, 2012 (AU) .............................. 2012903601

(51) Int. Cl.
*H04N 21/41* (2011.01)
*A63F 13/5255* (2014.01)
(Continued)

(52) U.S. Cl.
CPC ........ *A63F 13/5255* (2014.09); *A63F 13/213* (2014.09); *A63F 13/2145* (2014.09);
(Continued)

(58) Field of Classification Search
CPC .......... H04N 21/4622; H04N 7/17318; H04N 21/4782; H04N 21/8586; H04N 5/44543;
(Continued)

(56) References Cited

U.S. PATENT DOCUMENTS 8,325,151 B1 * 12/2012 Chan ..................... G06F 3/0487
345/173
2002/0154888 A1 * 10/2002 Allen ................... H04N 5/4403
386/230
(Continued)

FOREIGN PATENT DOCUMENTS

EP    2446943 A1    5/2012

OTHER PUBLICATIONS

International Search Report for PCT/SG2013/000281 dated Sep. 17, 2013.

*Primary Examiner* — Benjamin R Bruckart
*Assistant Examiner* — Anthony Bantamoi
(74) *Attorney, Agent, or Firm* — Sughrue Mion, PLLC

(57) ABSTRACT

There are disclosed control devices (30, 300, 600) for controlling a display device (80, 380, 680). According to one embodiment, the control device (30) is operable in multiple orientations. In response to detecting the change of orientation of the control device (30), a navigation menu (920) in relation to content (810, 820, 830) displayed by the display device (80) is generated in a processor (60) of the control device (30). The navigation menu (920) generated by the processor (60) is then displayed on a control device display (90) of the control device (30) to facilitate controlling the display device (80). There are also disclosed methods of controlling a display device using the aforementioned control devices (30, 300, 600).

22 Claims, 27 Drawing Sheets

(51) Int. Cl.
*A63F 13/2145* (2014.01)
*A63F 13/213* (2014.01)
*A63F 13/533* (2014.01)
*G06F 3/0488* (2013.01)
*G06F 3/0489* (2013.01)
*H04N 21/422* (2011.01)
*H04N 21/482* (2011.01)
*H04N 21/214* (2011.01)
*H04N 21/472* (2011.01)
*H04N 21/485* (2011.01)
*H04N 21/414* (2011.01)

(52) U.S. Cl.
CPC .......... *A63F 13/533* (2014.09); *G06F 3/0488* (2013.01); *G06F 3/0489* (2013.01); *H04N 21/2146* (2013.01); *H04N 21/4126* (2013.01); *H04N 21/41422* (2013.01); *H04N 21/42207* (2013.01); *H04N 21/42209* (2013.01); *H04N 21/42222* (2013.01); *H04N 21/42224* (2013.01); *H04N 21/47202* (2013.01); *H04N 21/482* (2013.01); *H04N 21/4852* (2013.01); *H04N 21/4854* (2013.01); *A63F 2300/105* (2013.01); *A63F 2300/202* (2013.01)

(58) Field of Classification Search
CPC .... H04N 21/2146; H04N 7/106; H04N 7/181; H04N 2005/4405; H04N 2005/4407; H04N 2005/4408; H04N 2005/441; H04N 2005/4412; H04N 2005/4414; G08C 2201/91; G08C 2201/92; G08C 2201/93; H03J 2200/22; H03J 2200/23; H03J 2200/24; H03J 2200/25; H03J 2200/26; B64D 11/0015; H04H 20/62
See application file for complete search history.

(56) References Cited

U.S. PATENT DOCUMENTS

2009/0253508 A1\* 10/2009 Koontz, II ............. G08C 23/04
463/37
2011/0314507 A1\* 12/2011 Keen ....................... H04N 7/18
725/77

\* cited by examiner

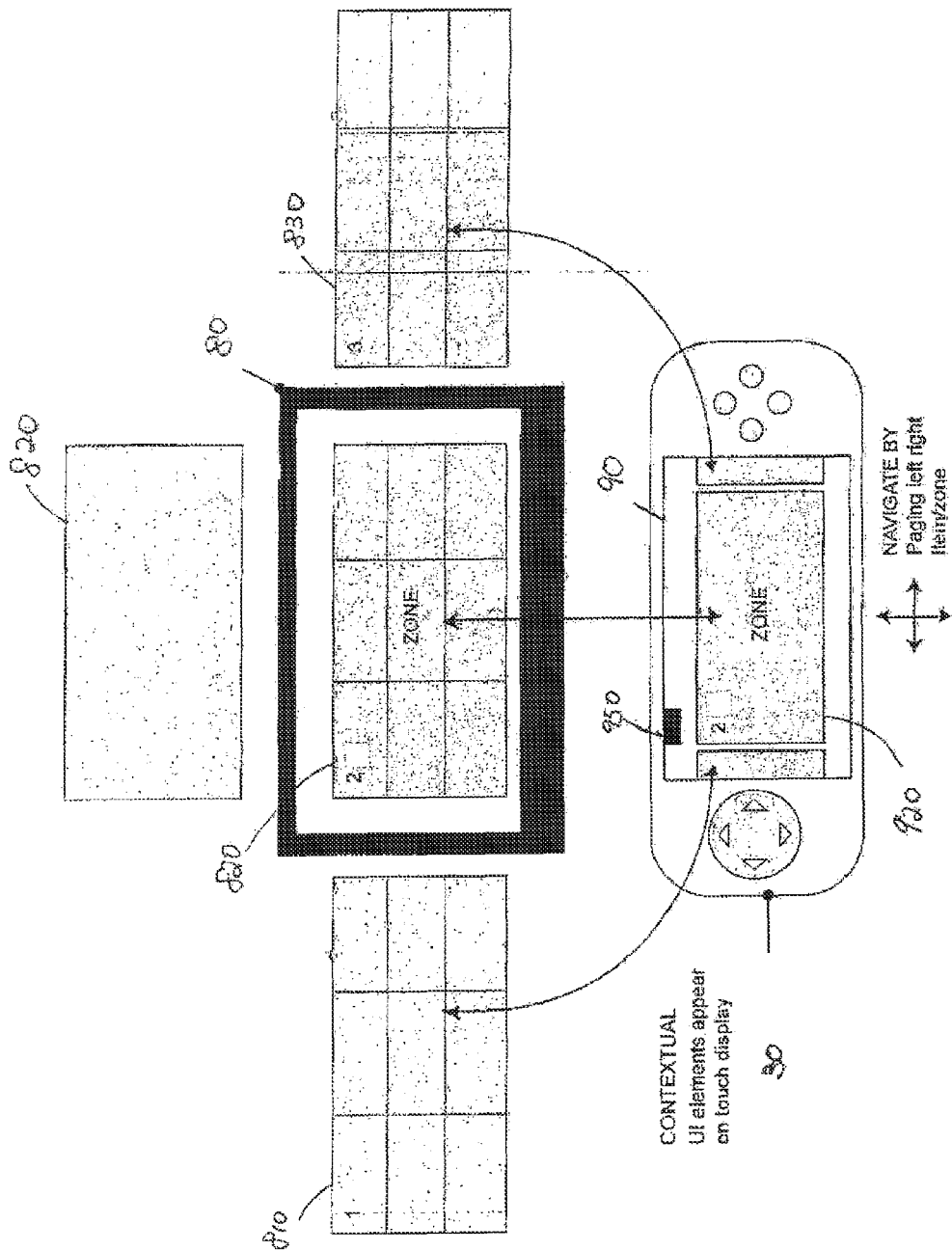

Touch input

METHOD AND DEVICE FOR CONTROLLING A DISPLAY DEVICE

FIELD

The present invention relates to a method and device for controlling a display device, and is of particular but by no means exclusive application in controlling a display of an in-flight entertainment (IFE) system of an aircraft.

BACKGROUND

Handset devices of IFE systems have evolved over the years from simple devices consisting of a few buttons to complex devices having multiple input mechanisms. Examples of input mechanisms used in handset devices of IFE systems include keypads, gamepads, trackballs, joysticks, scroll wheels, touch pads, track pads etc. Typically, each one of the input mechanisms of a handset device is used independently from the other input mechanisms. For example, the remote control of a known IFE system comprises a first keypad that is used to switch between movies, and a second keypad that is used to play games.

SUMMARY OF INVENTION

The present invention provides a method of controlling a display device using a control device that is operable in multiple orientations, the method including:

detecting a change of orientation of the control device;

in response to detecting the change of orientation of the control device, generating a navigation menu in relation to content displayed by the display device in a processor of the control device; and displaying the navigation menu generated by the processor on a control device display of the control device to facilitate controlling the display device.

The navigation menu may comprise a number of shortcuts or links for changing the content displayed by the display device. Additionally or alternatively, the navigation menu may comprise a portion of the content displayed by the display device.

The navigation menu may be generated based on the data received by the control device. Also, the navigation menu may comprise a video, audio, or video and audio control menu.

The method may include controlling the control device to control the content displayed on the display device.

In an embodiment, the step of controlling the control device includes changing the content displayed on the display device.

The method may include generating a new navigation menu in relation to the new content displayed by the display device, and displaying the new navigation menu in relation to the new content on the control device display of the control device.

In an embodiment, the control device display is a touchscreen display that is responsive to a touch input, and the step of controlling the control device includes providing the touch input to the touchscreen display to control the display device.

In an embodiment, the touch input includes a swiping or paging action by a user on the touchscreen display.

In an embodiment, the touch input includes a single touch action by the user on the touchscreen display.

The method may include controlling the control device to control the navigation menu displayed on the control device display without changing the content displayed on the display.

In an embodiment, the control device display is a touchscreen display that is responsive to a touch input, and the step of controlling the control device includes providing a touch input to the touchscreen display.

In an embodiment, the display device comprises a touchscreen display for displaying the content.

In an embodiment, the change in orientation is detected by an orientation detection mechanism, and the orientation detection mechanism is a gyroscope.

The present invention provides a control device for controlling a display device, the control device being operable in multiple orientations and including:

an orientation detection mechanism adapted to detect a change of orientation of the control device;

a processor configured to generate a navigation menu in relation to content displayed on the display device in response to a detection of the change of orientation by the orientation detection mechanism; and a control device display for displaying the navigation menu generated by the processor to facilitate controlling the display device.

In an embodiment, the navigation menu comprises a number of shortcuts or links for changing the content displayed by the display device.

In an embodiment, the navigation menu comprises a portion of the content displayed by the display device.

In an embodiment, the navigation menu is generated based on the data received by the control device.

In an embodiment, the navigation menu comprises a video, audio, or video and audio control menu.

In an embodiment, the control device is adapted to control the content displayed on the display device.

In an embodiment, the control device controls the content displayed on the display device by changing the content displayed on the display device.

In an embodiment, the control device changes the content displayed on the display device by:

generating a new navigation menu in relation to the new content displayed by the display device; and displaying the new navigation menu in relation to the new content on the control device display of the control device.

In an embodiment, the control device display is a touchscreen display that is responsive to a touch input, and the control device controls the content displayed on the display device based on the touch input to the touchscreen.

In an embodiment, the touch input includes a swiping or paging action by a user on the touchscreen display.

In an embodiment, the touch input includes a single touch action by the user on the touchscreen display.

In an embodiment, the control device is adapted to control the navigation menu displayed on the control device display without changing the content displayed on the display.

In an embodiment, the control device display is a touchscreen display that is responsive to a touch input, and the control device controls the navigation menu displayed on the control device display based on the touch input to the touchscreen display.

In an embodiment, the display device comprises a touchscreen display for displaying the content.

In an embodiment, the orientation detection mechanism is a gyroscope.

The invention also provides a method of controlling a display device using a control device, the method including:

receiving a selection of a navigation mode for the control device;

in response to a receipt of the selection of the navigation mode, generating contextual information in relation to content displayed by the display device in a processor of the control device; and displaying the contextual information generated by the processor on a control device display of the control device to facilitate controlling the display device.

In an embodiment, the control device display is a touchscreen display that is responsive to a touch input, and the method may include providing the touch input to the touchscreen display. In that event, the selection of the navigation mode is received upon the touch input being provided to the touchscreen display. The touch input may be a swiping, paging or dragging action close to a perimeter of the touchscreen display.

In an embodiment, the contextual information comprises a navigation menu.

In an embodiment, the contextual information comprises a portion of the content displayed by the display device.

In an embodiment, the contextual information is generated based on the data received by the control device.

In an embodiment the contextual information comprises a video, audio, or video and audio control menu.

The method may include controlling the control device display to control the content displayed on the display device.

The step of controlling the control device may include changing the content displayed on the display device. In that event, the method includes generating contextual information in relation to the new content displayed by the display device in the processor of the control device. In addition, the method includes displaying the contextual information in relation to the new content on the control device display of the control device.

In an embodiment, the control device display is a touchscreen display that is responsive to a touch input, and the step of controlling the control device includes providing the touch input to the touchscreen display to control the display device.

In an embodiment, the touch input includes a swiping or paging action by a user on the touchscreen display.

In another, although not the only possible, other embodiment, the touch input includes a single touch action by the user on the touchscreen display.

In another, although not the only possible, other embodiment, the touch input includes a tracking or dragging action.

The method may include controlling the control device display to control the contextual information displayed on the control device display without changing the content displayed on the display.

In an embodiment where the control device display is the touchscreen display that is responsive to the touch input, and the step of controlling the control device includes providing the touch input to the touchscreen display.

In an embodiment, the display device comprises a touchscreen display for displaying the content.

The invention also provides a control device for controlling a display device, the control device including:

a processor configured to receive a selection of a navigation mode for the control device, and to generate contextual information in relation to content displayed by the display device in response to a receipt of the selection of the navigation mode; and a control device display for displaying the contextual information generated by the processor to facilitate controlling the display device.

In an embodiment, the control device display is a touchscreen display that is responsive to a touch input, and the processor receives the selection of the navigation mode upon the touch input being provided to the touchscreen display.

In an embodiment, the touch input is a swiping, paging or dragging action close to a perimeter of the touchscreen display.

In an embodiment, the contextual information comprises a navigation menu.

In an embodiment, the contextual information comprises a portion of the content displayed by the display device.

In an embodiment, the contextual information is generated based on data received by the control device.

In an embodiment, the contextual information comprises a video, audio, or video and audio control menu.

In an embodiment, the control device is adapted to control the content displayed on the display device.

In an embodiment, the control device controls the content displayed on the display device by changing the content displayed on the display device.

In an embodiment, the control device changes the content displayed on the display device by:

generating contextual information in relation to new content displayed by the display device; and displaying the contextual information in relation to the new content on the control device display of the control device.

In an embodiment, the control device display is a touchscreen display, and the control device controls the content displayed on the display device based on the touch input to the touchscreen.

In an embodiment, the touch input includes a swiping, paging or dragging action by a user on the touchscreen display.

In an embodiment, the touch input includes a single touch action by the user on the touchscreen display.

In an embodiment, the control device is adapted to control the navigation menu displayed on the control device display without changing the content displayed on the display.

In an embodiment, the control device display is a touchscreen display that is responsive to a touch input, and the control device controls the navigation menu displayed on the control device display based on the touch input to the touchscreen display.

In an embodiment, the display device comprises a touchscreen display for displaying the content.

The present invention also provides a method of controlling a display device using a control device that is operable in multiple navigation modes, the method including:

receiving a selection of a navigation mode for the control device where the navigation mode is (a) a first navigation mode where a control device display of the control device displays information to facilitate controlling the display device or (b) a second navigation mode where the control device display does not display information to facilitate controlling the display device; and controlling the control device display to either display on the control device display information to facilitate controlling the display device in response to receiving a selection of the first navigation mode or not display on the control device display information to facilitate controlling the display device in response to receiving a selection of the second navigation mode.

In an embodiment, the control device display is a touchscreen display responsive to a touch input, and the user input is the touch input.

In an embodiment, the first navigation mode is a touchpad mode where the touchscreen display displays information to facilitate controlling the display device.

In an embodiment, the second navigation mode is a trackpad mode where the touchscreen display does not display information to facilitate controlling the display device.

In an embodiment, the step of controlling the control device display to not display on the control device display information to facilitate controlling the display device includes disabling the control device display from displaying any information.

In an embodiment, the step of controlling the control device display to not display on the control device display information to facilitate controlling the display device includes controlling the control device display to display a blank image.

The method may include displaying an indicator on the display device in response to receiving a selection of the second navigation mode.

The method may include receiving a touch input from the touchscreen display to control content displayed on the display device after receiving a selection of the second navigation mode.

In an embodiment, the touch input is a dragging action, and the position of the indicator displayed on the display device is modified according to the dragging action upon the dragging action being provided to the touchscreen display.

In an embodiment, the touch input is a tapping action.

In an embodiment, the touch input is a swiping action.

The method may include receiving a user input to control content displayed on the display device after receiving a selection of the second navigation mode.

In an embodiment, the user input is a hand motion detected by a motion detector.

In an embodiment, the motion detector is an infrared sensor.

In an embodiment, the display device comprises a touchscreen display for displaying the content.

The present invention also provides a control device for controlling a display device, the control device being operable in multiple navigation modes and including:
 a control device display; and
 a processor configured to receive a selection of a navigation mode for the control device where the navigation mode is (a) a first navigation mode where the control device display displays information to facilitate controlling the display device or (b) a second navigation mode where the control device display does not display information to facilitate controlling the display device, and control the control device display to either display on the control device display information to facilitate controlling the display device in response to receiving a selection of the first navigation mode or not display on the control device display information to facilitate controlling the display device in response to receiving a selection of the second navigation mode.

In an embodiment, the control device display is a touchscreen display responsive to a touch input, and the user input is the touch input.

In an embodiment, the first navigation mode is a touchpad mode where the touchscreen display displays information to facilitate controlling the display device.

In an embodiment, the second navigation mode is a trackpad mode where the touchscreen display does not display information to facilitate controlling the display device.

In an embodiment, the processor controls the control device display to not display on the control device display information to facilitate controlling the display device by disabling the control device display from displaying any information.

In an embodiment, the processor controls the control device display to not display on the control device display information to facilitate controlling the display device by controlling the control device display to display a blank image.

In an embodiment, an indicator is displayed on the display device upon the processor receiving a selection of the second navigation mode.

In an embodiment, the processor is configured to receive a touch input from the touchscreen display to control content displayed on the display device after receiving a selection of the second navigation mode.

In an embodiment, the touch input is a dragging action, and the position of the indicator displayed on the display device is modified according to the dragging action upon the dragging action being provided to the touchscreen display.

In an embodiment, the touch input is a tapping action.

In an embodiment, the touch input is a swiping action.

In an embodiment, the processor is configured to receive a user input to control content displayed on the display device after receiving a selection of the second navigation mode.

In an embodiment, the user input is a hand motion detected by a motion detector.

In an embodiment, the motion detector is an infrared sensor.

In an embodiment, the display device comprises a touchscreen display for displaying the content.

The invention also provides an in-flight entertainment system comprising a plurality of system units, each one of the system units comprising:
 a touchscreen display for displaying the content; and
 any one of the above control devices.

The invention also provides an aircraft comprising the above in-flight entertainment system.

It should be noted that any of the various features of each of the above aspects of the invention and of the various features of the embodiments described below, and indeed the various aspects themselves, can be combined as suitable and desired. It should also be noted that each of the individual features of the embodiments described below, alone or in combination with one or more other such features, constitute still further aspects of the invention.

BRIEF DESCRIPTION OF DRAWINGS

In order that the invention may be more clearly ascertained, embodiments will now be described, by way of example, with reference to the accompanying drawings, in which:

FIGS. 5A and 5B are schematic diagrams of illustrating examples of content and contextual information;

DETAILED DESCRIPTION

In general terms, the invention described in relation to the figures is a method of controlling a display device using a control device that is operable in at least two different modes of operation.

Referring to FIGS. 1A, 1B, 3A and 3B, there is illustrated a control device 30 (in the form of a handset controller) for controlling a display device 80 (such as a display of an in-flight entertainment (IFE) system) adapted to display content (such as a video stream, a navigation menu etc) to a user. The control device 30 is configured to receive a selection of a navigation mode for the control device 30, and to generate and display contextual information in relation to the content displayed on the display device 80 in response to a receipt of the selection of the navigation mode. Thus, the contextual information generated and displayed by the control device 30 depends on the selection of navigation mode for the control device 30.

In an advantageous embodiment, the control device 30 is adapted to receive the selection of the navigation mode upon a change of orientation of the control device 30. This embodiment of the control device 30 is advantageous in that it enables a user of the control device 30 to easily or quickly change the contextual information generated and displayed by the control device 30 by simply changing the orientation of the control device 30.

In a particularly advantageous embodiment, the control device 30 is additionally configured to communicate with the display device 80 to control the display device 80 in different modes of operation based on the orientation of the control device 30. This particularly advantageous embodiment has an additional advantage that it enables a user of the control device 30 to easily or quickly alternate between different ways of controlling the display device 80 by simply changing the orientation of the control device 30.

Figure 1A:
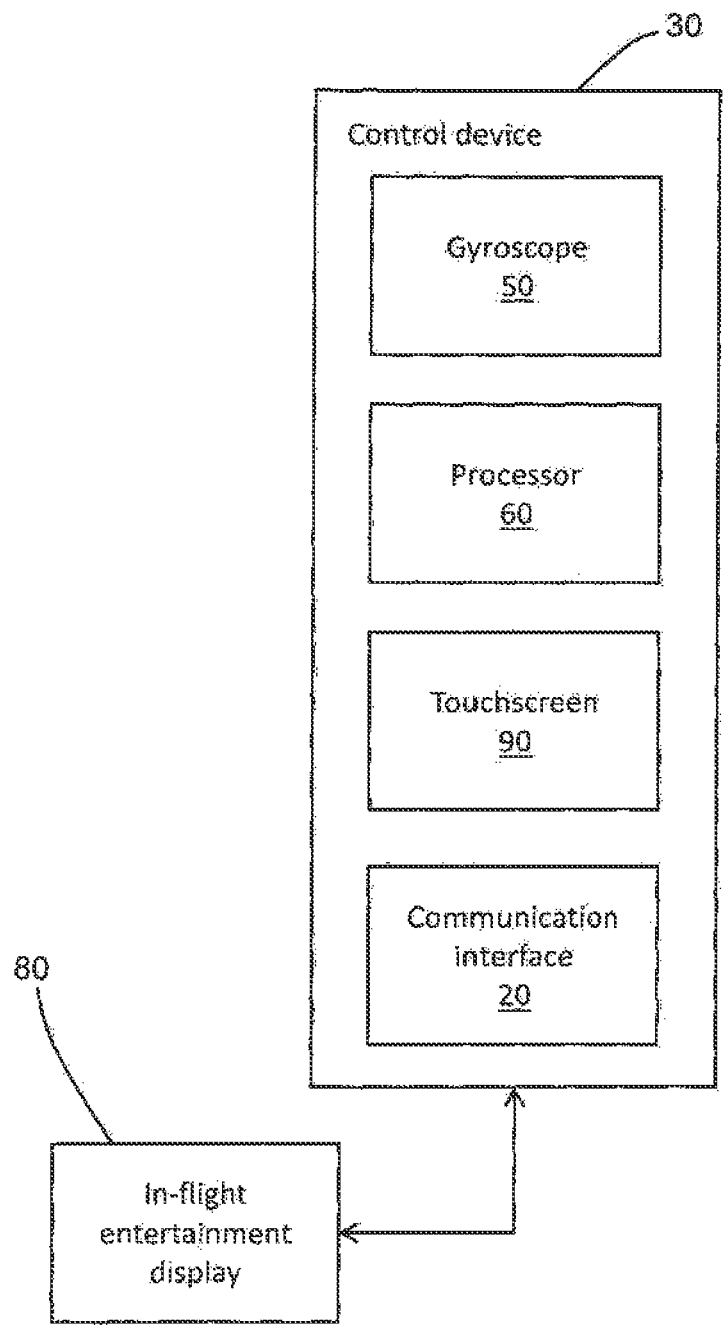
FIG. 1A is a block diagram of the physical components of a control device and a display device in accordance with one embodiment of the invention.

FIG. 1A is a block diagram of the physical components of an embodiment of the control device 30 in data communication with a display device 80. In this embodiment, the display device 80 is an IFE touchscreen display and the control device 30 is a handset controller for controlling the IFE display. However, it is envisaged that the display device 80 may not be an IFE display and that the control device 30 may not be a handset controller for controlling an IFE display. In particular, it is envisaged that the display device 80 need not be a touchscreen display.

The control device 30 comprises an orientation detection mechanism 50, a processor 60 and a display 90.

The orientation detection mechanism 50 is adapted to detect a change of orientation of the control device 30. In this embodiment, the orientation detection mechanism 50 is a gyroscope. However, it is envisaged that the orientation detection mechanism 50 may not be a gyroscope. For example, the orientation mechanism 50 may alternatively be an accelerometer in an alternative embodiment. Also, it is envisaged that there may be two or more separate mechanisms in the orientation detection mechanism 50. For example, the orientation mechanism 50 may include an accelerometer in addition to a gyroscope in an alternative embodiment.

The processor 60 is configured to generate contextual information in relation to the content displayed on the IFE display 80. The processor 60 generates the contextual information automatically in response to detection by the orientation detection mechanism 50 that there is a change of orientation of the control device 30. Examples of contextual information that may be generated by the processor 60 include: a simplified or modified version of the content displayed by the IFE display 80 (such as a version including only text and not the images of the content, a version comprising only a portion of the content, or a scaled down version of the content), a navigation menu comprising a number of shortcuts or links for enabling a user to control the IFE display 80 to change the content displayed on the IFE display 80 etc. A more detailed description of an example of the contextual information generated by the processor 60 is provided below.

The display 90 of the control device 30 is adapted to display the contextual information generated by the processor 60. The control device 30 is configured to display the contextual information generated by the processor 60 on the display 90 automatically after the contextual information is generated by the processor 60.

In this embodiment, the display 90 is a touchscreen display adapted to receive a touch input (for example, when a user performs on the display 90 a swiping or paging action, a tracking or dragging action, a single tap action, a double tap action, a press and hold action etc). New Contextual information may be generated by the processor 60 and displayed by the touchscreen display 90 in response to either a change of orientation detected by the gyroscope 50 or a touch input on the display 90 from a user. For example, the IFE display 80 may change the content displayed by the IFE display 80 from one of a series of inter-related content (such a photograph or picture of an album) to a subsequent one of the series of inter-related content when a user performs a swiping or paging action on the touchscreen display 90. Also, contextual information displayed on the touchscreen display 90 may be modified while a user is touching the touchscreen display 90. For example, the touchscreen display 90 may highlight a portion of the content displayed by the IFE display 80 corresponding to a portion displayed by the touchscreen display 90 depending on the spatial position of the finger on the touchscreen display 90, or when a user performs a tracking or dragging action on the touchscreen display 90 to the portion displayed by the touchscreen display 90.

The control device 30 also includes a communication interface 20. The communication interface 30 enables the control device 30 to communicate with the IFE display 80 to control or cause the IFE display 80 to change the content displayed by the IFE display 80. The control device 30 automatically communicates with the IFE display 80 via the communication interface 20 to control or cause the IFE display 80 to change the content displayed by the IFE display 80 in response to the touchscreen display 90 receiving a touch input.

The communication from the control device 30 to the IFE display 80 depends on the contextual information displayed on the touchscreen display 90. Thus, the operation of the contact device 30 is different depending on the orientation of the control device 30. In this embodiment, the control device 30 is operable in a "Quick" mode where the touchscreen display 90 displays a navigation menu comprising a plurality of links, and a "Sequential" mode where the touchscreen display 90 displays either a simplified, modified or scaled down version of the content displayed on the IFE display 80. Depending on implementation, the control device 30 may default to either the "Quick" mode or the "Sequential" mode when in use. A more detailed description of the two modes is described below.

It will be appreciated that the control device 30 is configured to operate in real-time such that the changes to the contextual information on the touchscreen 90 of the control device 30 is substantially synchronized with the changes to the content on the IFE display 80.

It is envisaged that the control device 30 may additionally be configured to communicate with the IFE display 80 to control or cause the IFE display 80 to change the content displayed by the IFE display 80 in response to a detection of a change of orientation of the control device 30 by the gyroscope 50 even if no touch input is received. For example, changing the orientation of the control device 30 may automatically result in a display of a navigation menu on the IFE display 80.

Also, it is envisaged that the control device 30 may include additional components. For example, the control device 30 may include additional input mechanisms such as a gamepad.

Figure 1B:
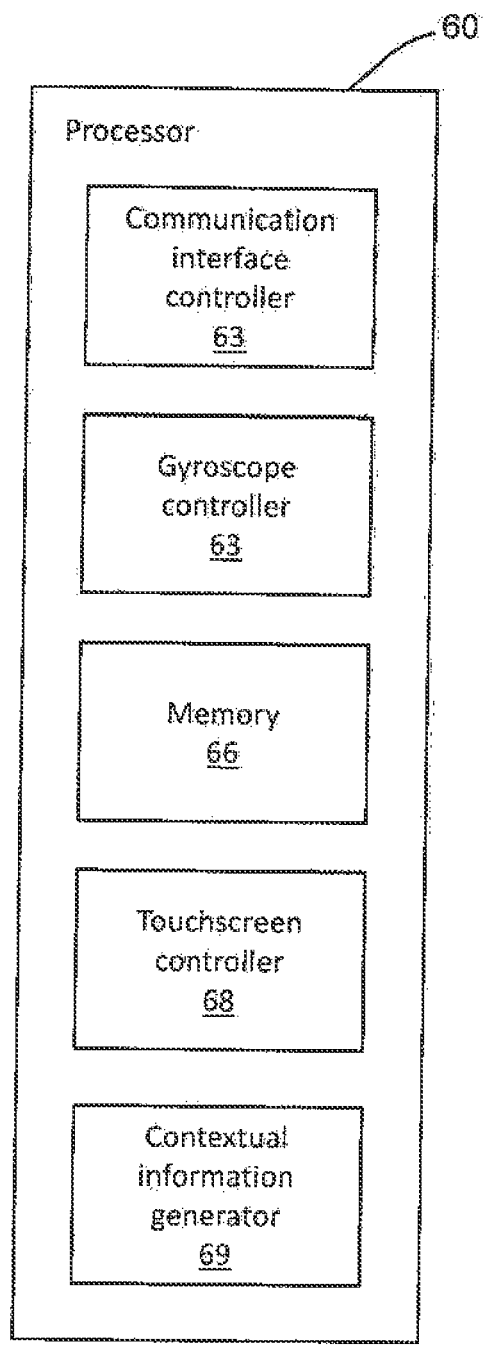
FIG. 1B is a functional block diagram of the functional components implemented by the processor of the control device of FIG. 1A.

FIG. 1B is a functional block diagram of the processor 60 of the control device of FIG. 1A.

Persons skilled in the art will appreciate that the processor 60 may be implemented in different ways. In this embodiment, the processor 60 is a processing unit implementing a number of software modules based on program code and data stored in a memory 66 of the processor 60. However, persons skilled in the art will appreciate that one or more of the modules may alternatively be implemented by a dedicated programmable logic controller (PLC). Also, persons skilled in the art will appreciate that the modules may be distributed between the control device 30 and the IFE system.

The modules implemented by the processor 60 include a communication interface controller 63, a gyroscope controller 63, a touchscreen controller 68, and a contextual information generator 69.

The communication interface controller 63 is configured to receive data (such as data with respect to the content displayed by the IFE system 80 etc) from the IFE device 80, and to transmit data (such as commands to control the IFE device 80 etc) to the IFE device 80.

The gyroscope controller 63 is configured to receive a detection of a change of orientation of the control device 30 by the gyroscope 50.

The contextual information generator 69 is configured to generate contextual information based on a detection of a change of orientation of the control device 30 by the gyroscope 50 or a receipt of a touch input by the control device 30. In this respect, it will be appreciated that the contextual information may be generated in different ways depending on the type of contextual information to be generated. For example, the contextual information may be generated based on data received by the control device 30 from the IFE display 80. Alternatively, the contextual information may be generated simply by retrieving data stored in the memory 66.

The touchscreen controller 68 is configured to control the touchscreen display 90 to display or modify the contextual information generated by the contextual information generator 69, and to receive touch inputs from the touchscreen display 90.

Figure 2:
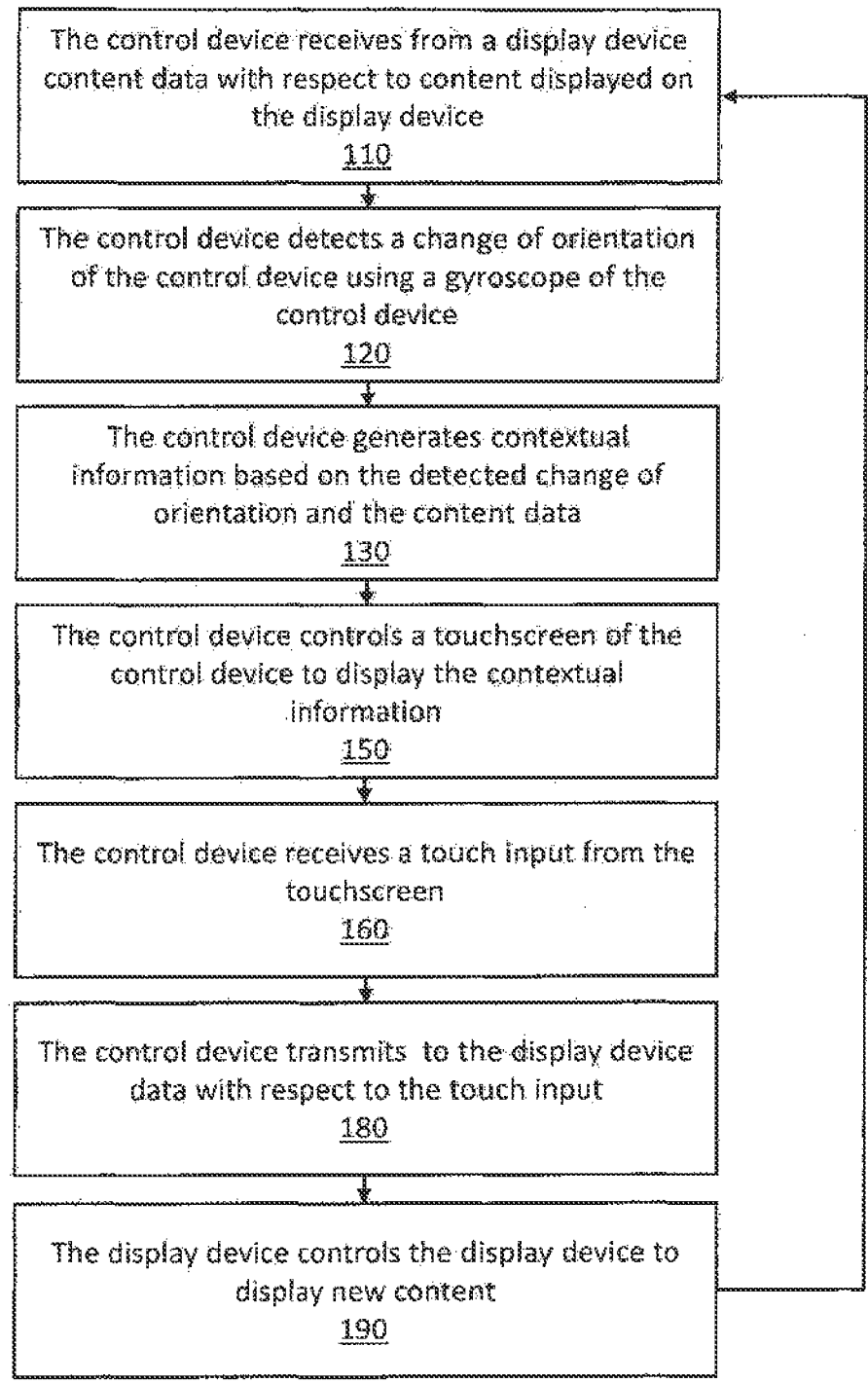
FIG. 2 is flow chart of a method of controlling a display device carried out by the control device of FIG. 1A.

FIG. 2 is a flowchart of an embodiment of the method of the present invention. At step 110, the control device 30 receives from the IFE display 80 via the communication interface 20 content data with respect to content displayed on the IFE display 80. At step 120, the gyroscope 50 of the control device 30 detects a change of orientation of the control device 30. At step 130, the processor 60 of the control device 30 generates contextual information based on the detected change of orientation and the content data received via the communication interface 20 from the IFE display 80. At step 150, the touchscreen 90 of the control device 30 displays the contextual information generated by the processor 60. At step 160, the control device 30 receives a touch input from a user via the touchscreen 90. At step 180, the control device 30 communicates data with the IFE display 80 to transmit data with respect to the touch input. At step 190, the IFE display 80 displays new content based on the communication from the control device 30 at step 180.

Figure 3A:
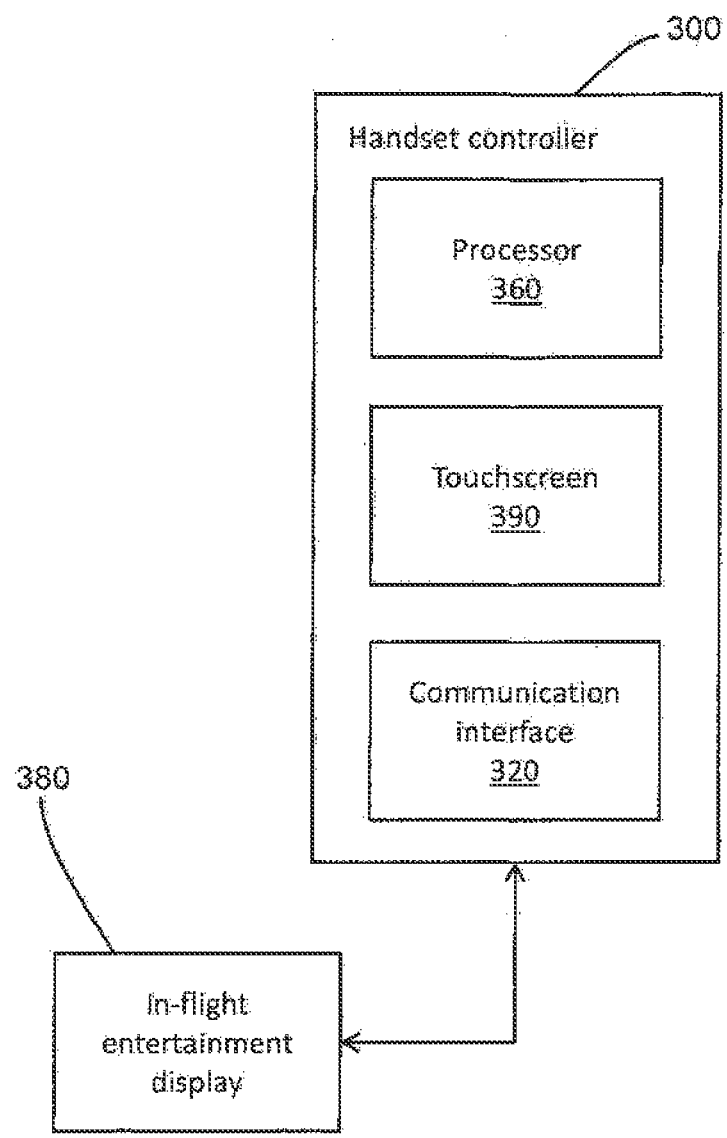
FIG. 3A is a block diagram of the physical components of a control device and a display device in accordance with an alternative embodiment of the invention.

FIG. 3A is a block diagram of the physical components of an alternative embodiment of the control device 300. Like the embodiment of FIGS. 1A and 1B, the control device 300 is also a handset controller for controlling an IFE display 380 for displaying content to a user.

The handset controller 300 comprises a processor 360 and a display 390 in the form of a touchscreen display. The touchscreen display 390 is adapted to receive a touch input for selecting a navigation mode for the handset controller 300. In this embodiment, the touch input corresponds to a swiping or dragging action on or close to a perimeter of the touchscreen display 390 of the handset controller 300 by the user. However, persons skilled in the art will appreciate that the touch input may be on a portion of the touchscreen display 390 that is not on or close to the perimeter of the touchscreen display 390, or may be a touch action that is different to a swiping or dragging action (such as a tapping action). Also, it is envisaged that an alternative embodiment of the handset controller 300 may comprise a gyroscope (like the one described with respect to the embodiment of FIGS. 1A and 1B), and may be additionally configured to receive a selection of a navigation mode for the handset controller 300 via a change of orientation of the handset controller 300.

The processor 360 is configured to receive a selection of the navigation mode upon the touchscreen display 390 receiving the touch input for selecting the navigation mode for the handset controller 300. The processor 360 is also configured to generate contextual information in relation to the content displayed on the IFE display 380 in response to receipt of the selection of the navigation mode, and to display the generated contextual information on the touchscreen display 390 of the handset controller 300.

The handset controller 300 also includes a communication interface 320 to enable the handset controller 300 to communicate with the IFE display 380 to control or cause the IFE display 380 to change the content displayed by the IFE display 380. The handset controller 300 automatically communicates with the IFE display 380 via the communication interface 320 to control or cause the IFE display 380 to change the content displayed by the IFE display 380 in response to the touchscreen display 390 receiving a touch input.

Figure 3B:
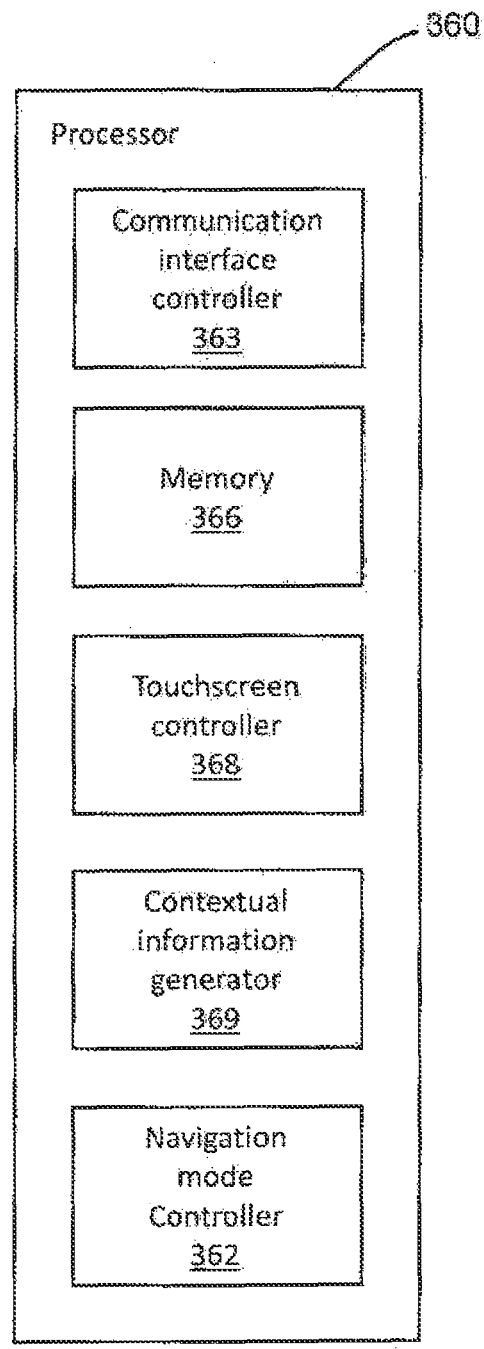
FIG. 3B is a functional block diagram of the functional components implemented by the processor of the control device of FIG. 3A.

FIG. 3B is functional block diagram of the processor 360 of the handset controller 300 of FIG. 3A.

The processor 360 is configured to implement a number of modules based on program code and data stored in a memory 366 of the processor 360. The modules include a navigation mode receiver 362, a touchscreen controller 368, a contextual information generator 369 and a communication interface controller 363.

The navigation mode receiver 362 is configured to receive a selection of the navigation mode for the handset controller 300 upon the touchscreen display 390 of the handset controller 300 receiving a swiping or dragging action on or close to a perimeter of the touchscreen display 390 of the handset controller 300.

The contextual information generator 369 is configured to generate contextual information based on the selected navigation mode in response to a receipt of the selection of the navigation mode by the navigation mode receiver 362.

The touchscreen controller 368 is configured to control the touchscreen display 390 of the handset controller 300 to display the contextual information generated by the contextual information generator 369.

The communication interface controller 363 is configured to receive data (such as content data) from the IFE device 380 via the communication interface 320 of the handset controller 300, and to transmit data (such as request data for requesting content data, and command data to change the content displayed by the IFE display 380) via the communication interface 320 to the IFE device 380.

In this embodiment, the handset controller 300 is operable in two navigation modes: the quick navigation mode and the sequential navigation mode. However, it is envisaged that the handset controller 300 may be operable in more than two navigation modes and that the processor 360 of the handset controller 300 may be configured to switch between the various modes depending on the touch input for selecting the navigation mode from the user. For example, while the handset controller 300 is operating in a first navigation mode, a touch input on a first perimeter of the touchscreen display 390 may cause the handset controller 300 to switch to a second navigation mode, but a touch input on a second perimeter of the touchscreen display 390 that is not the same as the first perimeter may cause the handset controller 30 to switch to a third navigation mode.

Figure 4:
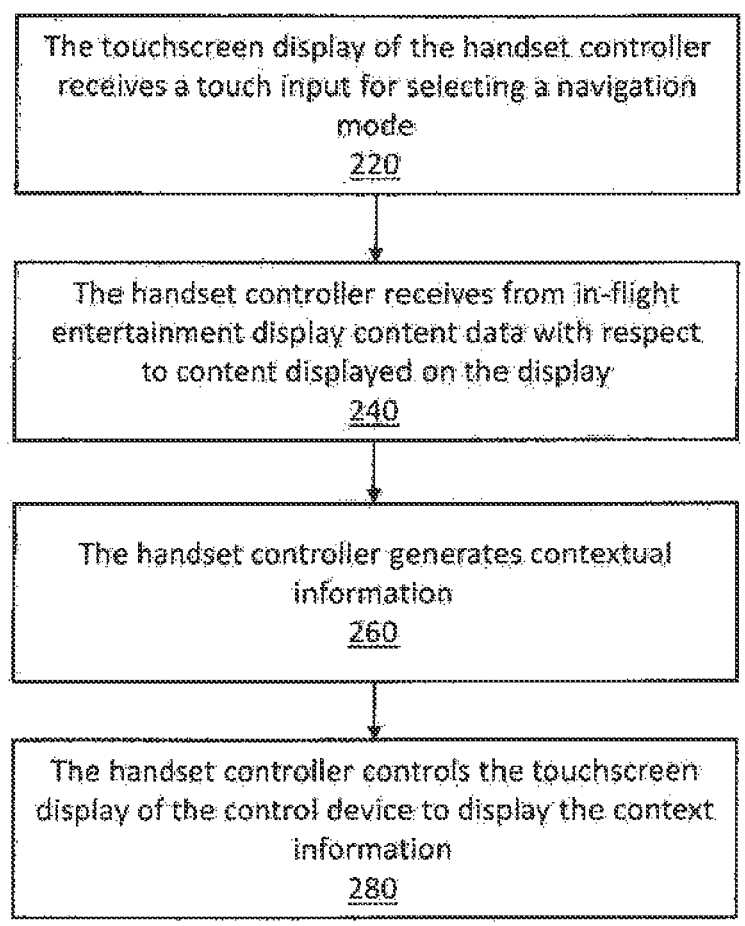
FIG. 4 is flow chart of a method of controlling a display device carried out by the control device of FIG. 3A.

FIG. 4 a flowchart of an embodiment of the method of the present invention. At step 220, the touchscreen display 390 of the handset controller 300 receives a touch input corresponding to a swiping or dragging action on or close to a perimeter of the touchscreen display 390. Upon the touchscreen display 390 receiving the touch input, the navigation mode receiver 362 implemented by the processor 300 of the handset controller 300 receives a selection of a navigation mode for the handset controller 300. At step 240, the communication interface controller 363 implemented by the processor 360 of the handset controller 300 receives content data from the IFE display 380 via the communications interface 320 of the handset controller 300 after the communication interface controller 363 transmits a request for the content data to the IFE display 380 via the communications interface 320. At step 260, the contextual information generator 369 implemented by the processor 360 of the handset controller 300 generates contextual information based on the content data received from the IFE display 380 and the selected navigation mode. At step 280, the touchscreen controller 368 implemented by the processor 360 of the handset controller 300 controls the touchscreen display 390 to display the contextual information generated by the contextual information generator 369.

Figure 9A:
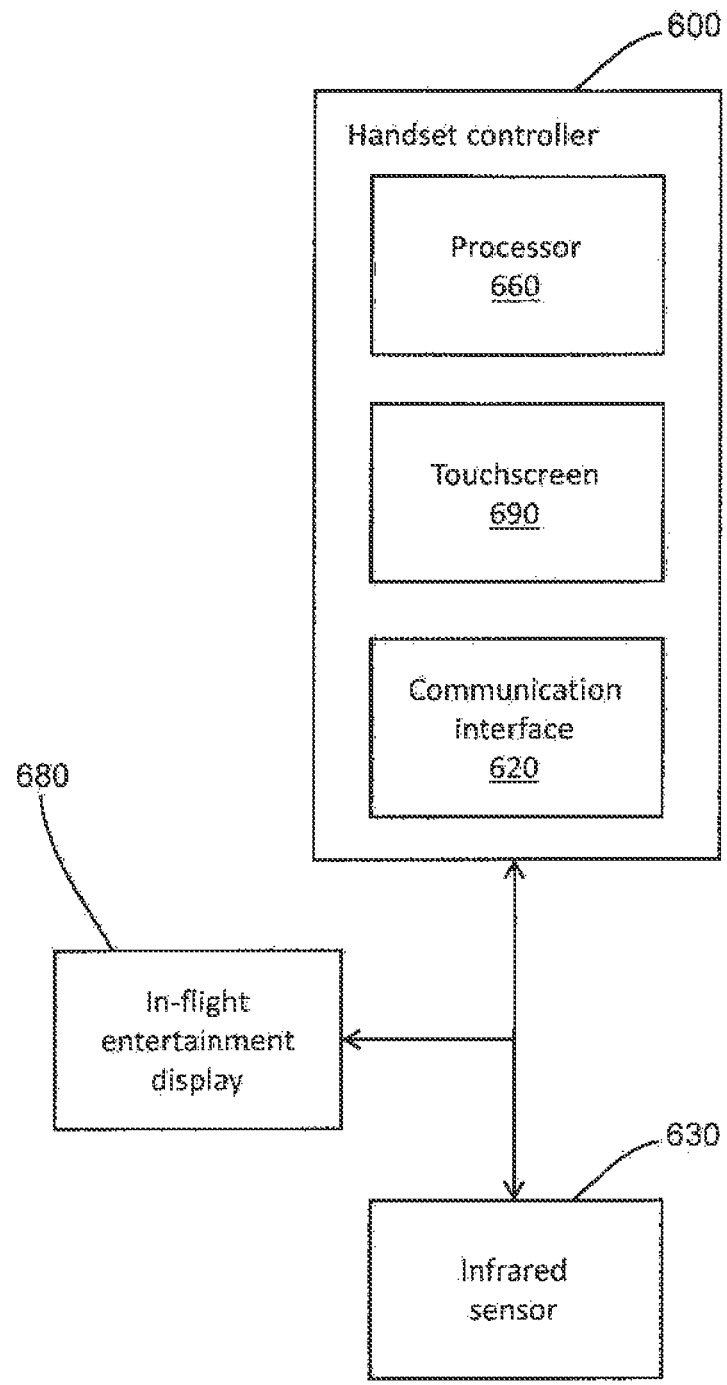
FIG. 9A is a block diagram of the physical components of a control device and a display device in accordance with yet another embodiment of the invention.

FIG. 9A is a block diagram of the physical components of yet another alternative embodiment of the control device 600. Like the embodiment of FIGS. 1A, 1B, 3A and 3B, the control device 600 is also a handset controller for controlling an IFE display 680 for displaying content to a user. The handset controller 600 is in data communication with a motion detector 630. However, it is envisaged that an alternative embodiment of the handset controller 600 may not be in data communication with a motion detector. The motion detector 630 is an infrared sensor. However, persons skilled in the art will appreciate that the motion detector 630 may not be an infrared sensor. For example, the motion detector 630 may alternatively be a microwave sensor or an ultrasonic detector.

The handset controller 600 comprises a communication interface 620 for communicating with the IFE display 680 and the infrared sensor 630, for example, to output data to the IFE display 680 to change the content displayed on the IFE display 680, and to receive from the infrared sensor 630 data indicating a motion detected by the infrared sensor 630.

The handset controller 600 also comprises a touchscreen display 690 and a processor 660 for controlling the touchscreen display 690 and the communication interface 620. The touchscreen display 690 is responsive to a touch input for controlling the IFE display 680 and/or the handset controller 600. For example, a user of the handset controller 600 can change content displayed on the IFE display 680 and/or content displayed on the touchscreen display 690 by touching or contacting the touchscreen display 690. As indicated above with respect to the embodiments of FIGS. 1A, 1B, 3A and 3B, the touch input may be a swiping, tapping or dragging action.

The handset controller 600 is operable in at least two navigation modes: a touchpad mode and a trackpad mode. In the touchpad mode, the touchscreen display 690 of the handset controller 600 is responsive to touch inputs and displays information to facilitate controlling the IFE display 680. In the trackpad mode, the touchscreen display 690 of the handset controller 600 is responsive to touch inputs, but is disabled from displaying information to facilitate controlling the IFE display 680. Depending on the implementation, the touchscreen display 690 may be disabled by disabling the touchscreen display 690 from displaying just information that facilitates controlling of the IFE display 680 or any information. Persons skilled in the art would appreciate that disabling the touchscreen display 690 from displaying information may in effect be the same as controlling the touchscreen display 690 to display a blank image, or simply not updating the display on the touchscreen 690.

In this embodiment, when the handset controller 600 is operating in the touchpad mode, a scaled down version of the content displayed on the IFE display 680 is shown on touchscreen display 690. An action on the touchscreen display 690 would be mirrored on the IFE display 680. For example, a left swipe action on the touchscreen display 690 would change the content on both the touchscreen display 690 and the IFE display 680. In an alternative embodiment, contextual information corresponding to the content displayed on the IFE display 680 may be shown on the touchscreen display 690 in addition to the scaled down version of the content displayed on the IFE display 680.

It is envisaged that an alternative embodiment of the handset controller 600 may be operable in more than two navigation modes. For example, an alternative embodiment of the handset controller 600 may additionally be operable in a display mode where the touchscreen display 690 displays information to facilitate controlling the IFE display 680, but is disabled from receiving any touch inputs (in effect ignoring any touch inputs provided to the touchscreen display 690). In another example, an alternative embodiment of the handset controller 600 may additionally operate in the quick navigation mode or the sequential navigation mode indicated in relation to the embodiment of FIGS. 3A and 3B.

Also, it is envisaged that an alternative embodiment of the handset controller 600 may change the manner in which the handset controller 600 must be used when the handset controller 600 changes from the touchpad mode to the trackpad mode. For example, in an alternative embodiment, when the handset controller 600 changes from the touchpad mode to the trackpad mode, an indicator (like a mouse pointer) may be displayed on the IFE display 680. In such an alternative embodiment, a dragging action on the touchscreen 690 of the handset controller 600 may just move the indicator like a traditional trackpad.

Figure 9B:
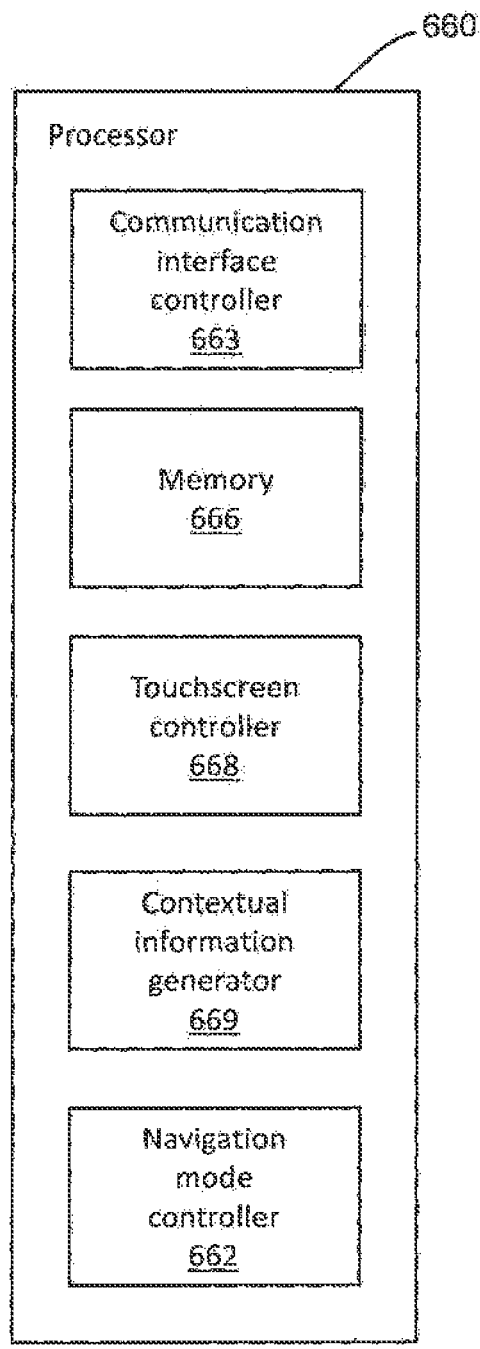
FIG. 9B is a functional block diagram of the functional components implemented by the processor of the control device of FIG. 9A.

FIG. 9B is functional block diagram of the processor 660 of the handset controller 600 of FIG. 9A. The processor 660 is configured to implement a number of modules based on program code and data stored in a memory 366 of the processor 360. The modules include a navigation mode receiver 662, a touchscreen controller 668, a contextual information generator 669 and a communication interface controller 663.

The navigation mode receiver 662 is configured to receive a selection of the navigation mode for the handset controller 600 upon a touch input for selecting a navigation mode provided on the touchscreen display 690 of the handset controller 600. The touch input for selecting the navigation mode is a tapping action on a portion of a navigation menu displayed on the touchscreen display 690. However, it is envisaged that the touch input may not be a tapping action on a portion of a navigation menu displayed on the touchscreen display 690. For example, the touch input for selecting the navigation mode may alternatively be a swiping or dragging action on a designated portion of the touchscreen display 690 of the handset controller 600 in an alternative embodiment. It is also envisaged that in an alternative embodiment, a selection of the navigation mode may not be received by the touchscreen display 690. For example, a selection may be received by an alternative embodiment of the handset controller 600 upon a detection of a hand motion by the infrared sensor 630, or in an embodiment where the IFE display is a touchscreen display, upon a touch input provided to the IFE display.

The contextual information generator 669 is configured to generate contextual information when the handset controller 600 operating in the touchpad mode. Like the embodiments of FIGS. 1A, 1B, 3A and 3B, the contextual information may be generated based on content data with respect content display on the IFE display 680. In an embodiment where the handset controller 600 is adapted to operate in different touchpad modes (for example, the quick navigation mode and the sequential navigation mode mentioned above), the contextual information may be generated depending on which navigation mode the handset controller 600 is operating in.

The touchscreen controller 668 is configured to control the touchscreen display 690 of the handset controller 300 to display the contextual information generated by the contextual information generator 669 when the handset controller 600 operating in the touchpad mode, and to control the touchscreen display 690 to disable the touchscreen display 690 from displaying information when the handset controller 600 operating in the trackpad mode.

The communication interface controller 663 is configured to receive data from the IFE display 680 via the communication interface 620, and to transmit data via the communication interface 620 to the IFE display 680. In particular, the communication interface controller 663 is configured to receive data (such as data with respect to the content displayed by the IFE display 680) from the IFE display 680, and to transmit data (such as commands to control the IFE display 680) to the IFE display 680.

Figure 10:
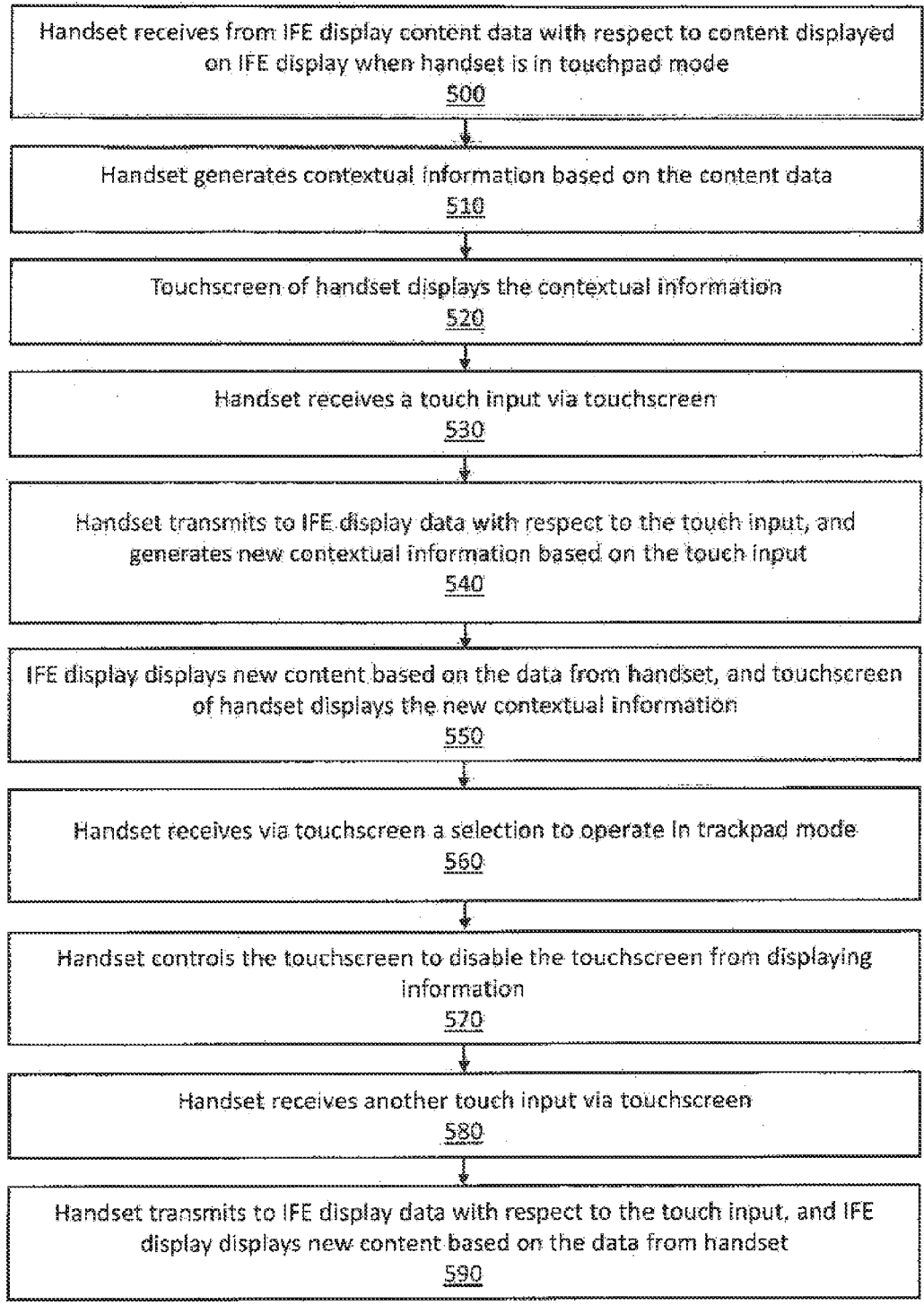
FIG. 10 is flow chart of a method of controlling a display device carried out by the control device of FIG. 9A.

FIG. 10 a flowchart of an embodiment of the method of the present invention. At step 500, while operating in the touchpad mode, the handset 600 receives from the IFE display 680 content data with respect to content displayed on the IFE display 680 via the communication interface 620 of the handset 600. At step 510, the contextual information generator 669 implemented by the processor 660 generates contextual information based on the content data received from the IFE display 680. At step 520, the touchscreen controller 668 implemented by the processor 660 controls the touchscreen 690 of the handset 600 to display the contextual information generated by the contextual information generator 669.

At step 530, the handset 600 receives a user input in the form of a touch input provided by a user of the handset 600 on the touchscreen 690. As indicated above, the user input may alternatively be received upon a detection of a motion by the infrared sensor 630. At step 540, the communication interface controller 663 implemented by the processor 660 controls the communication interface 620 to transmit to the IFE display 680 data with respect to the touch input, and the contextual information generator 669 generates new contextual information based on the touch input. At step 550, the IFE display 680 displays new content based on the data transmitted from the handset 600, and the touchscreen 690 displays the new contextual information generated by the contextual information generator 669.

At step 560, the handset 600 receives another touch input corresponding to a selection of the trackpad mode for the handset 600. At step 570, the navigation mode controller 662 controls the touchscreen 690 to disable the touchscreen from displaying any contextual information.

At step 580, the handset 600 receives yet another touch input provided by a user of the handset 600 on the touchscreen 690. At step 540, the communication interface controller 663 implemented by the processor 660 controls the communication interface 620 to transmit to the IFE display 680 data with respect to the touch input, and the IFE display 680 displays new content based on the data transmitted from the handset 600.

Figure 5A:
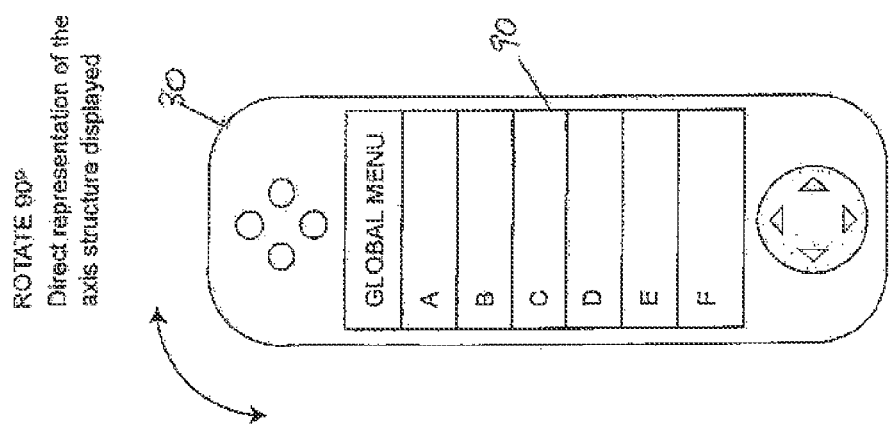

FIG. 5A is a schematic diagram illustrating an example of the contextual information displayed by the touchscreen display 90 of the control device 30 when the control device 30 is operating in a "Sequential" mode. In this example, the handset 30 operates in the "Sequential" mode when the handset 30 is in a horizontal orientation. As illustrated, the IFE display 80 is displaying content 820 and the handset 30 is displaying contextual information 920 in relation to the content 820 on the touchscreen 90 of the handset 30. The content 820 is one of a series of inter-related content 810, 820, 830. When the user performs a right to left paging or swiping motion on the touchscreen 90 of the handset 30, the IFE display 80 changes from content 820 to content 830. When the user performs a left to right paging or swiping motion on the touchscreen 90 of the handset 30, the IFE display 80 changes from content 820 to content 810. The contextual information 920 displayed on the touchscreen display 90 changes according to changes in the content displayed on the IFE display 80. In this case, the contextual information 920 displayed on the touchscreen 90 includes an expandable menu icon 950.

FIG. 5B is a schematic diagram illustrating an example of the contextual information displayed by the touchscreen display 90 of the control device 30 when the control device 30 is operating in a "Quick" mode. In this example, the handset 30 operates in the "Quick" mode when the handset 30 is in a vertical orientation. As illustrated, the contextual information displayed on the touchscreen 90 is a navigation menu ("GLOBAL MENU") comprising a plurality of links ("A", "B", "C", "D", "E", "E" and "F").

FIGS. 6A to 6H are screen mock-ups illustrating a series of contextual information 920 displayed on the touchscreen 90 of the control device 30 and content 820 displayed on the IFE display 80 when the control device 30 is being used by a user while the control device 30 is operating in the "Sequential" mode.

Figure 6A:
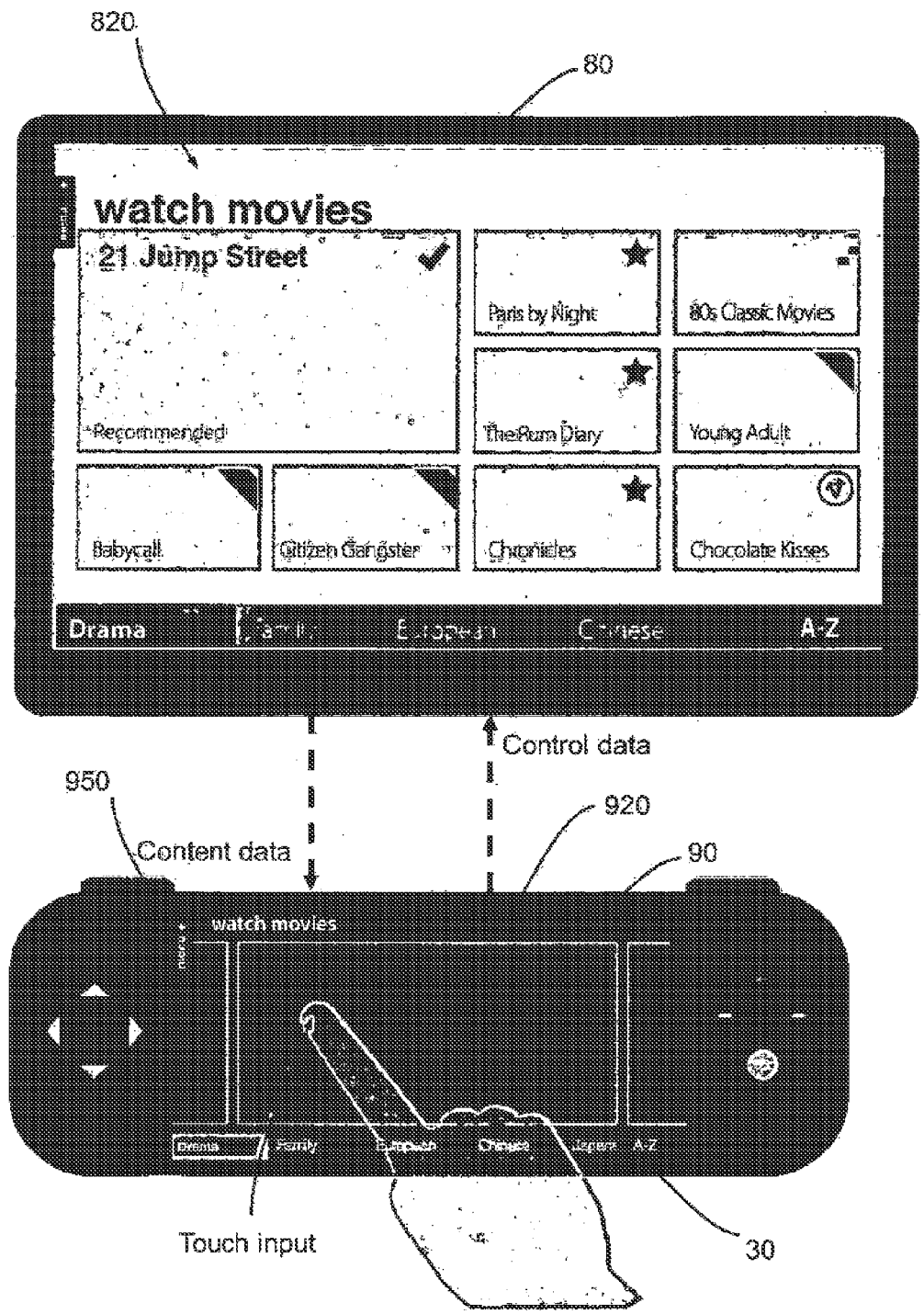
FIGS. 6A to 6H are screen mock-ups illustrating a series of content and contextual information.

In FIG. 6A, the contextual information 920 is a simplified version of the content 820 displayed on the IFE display 80 is displayed on the touchscreen display 90 of the control device 30. In this example, the contextual information 920 displayed on the touchscreen 90 includes an expandable menu icon 950. The figure indicates that data with respect to the content 820 ("content data") is received by the control device 30, and that data for controlling the IFE display 80 ("command data") is transmitted to the IFE display 80 to control the display on the IFE display 80.

Figure 6B:
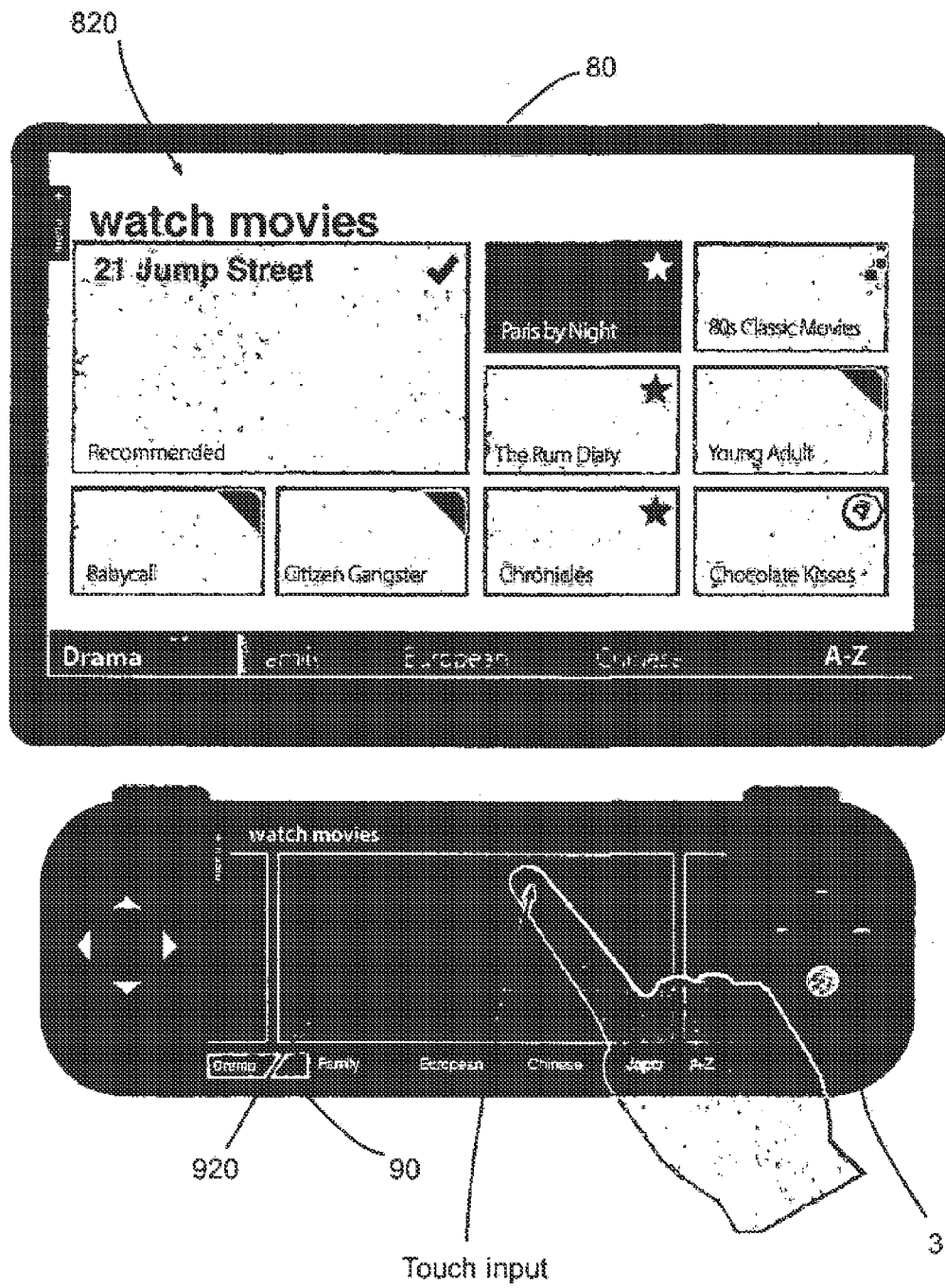

FIG. 6B illustrates that the content 820 on the IFE display 80 may change to show a highlighted portion after a user performs a drag and stop action to a portion of the contextual information 920 on the touchscreen display 90. The drag and stop action is a tracking or dragging action. Another option for changing the content 820 on the IFE display 80 is to use a swipe action on the touchscreen display 90.

Figure 6C:
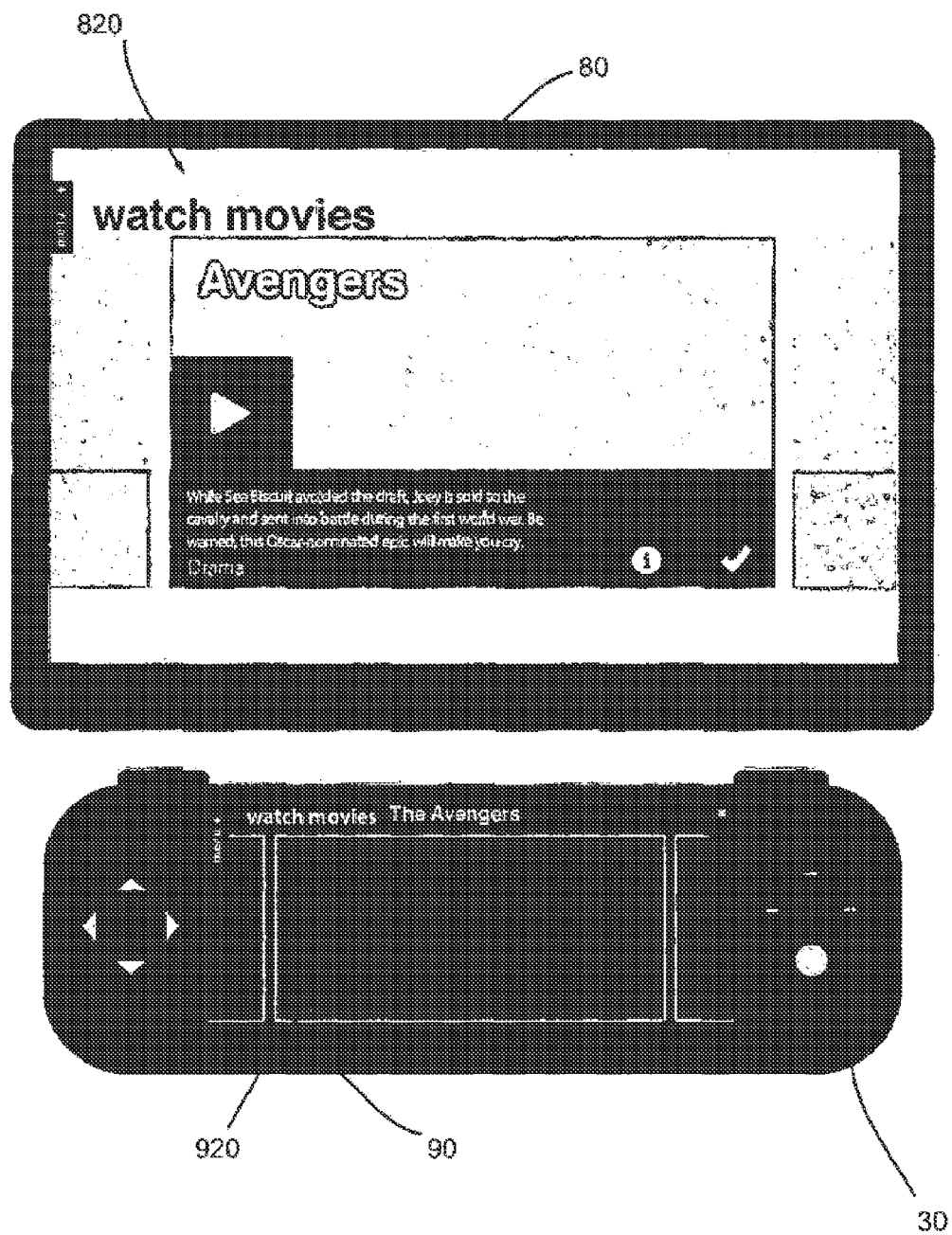

FIG. 6C illustrates the contextual information 920 and content 820 after the user selects a movie by tapping the touchscreen display 90.

Figure 6D:
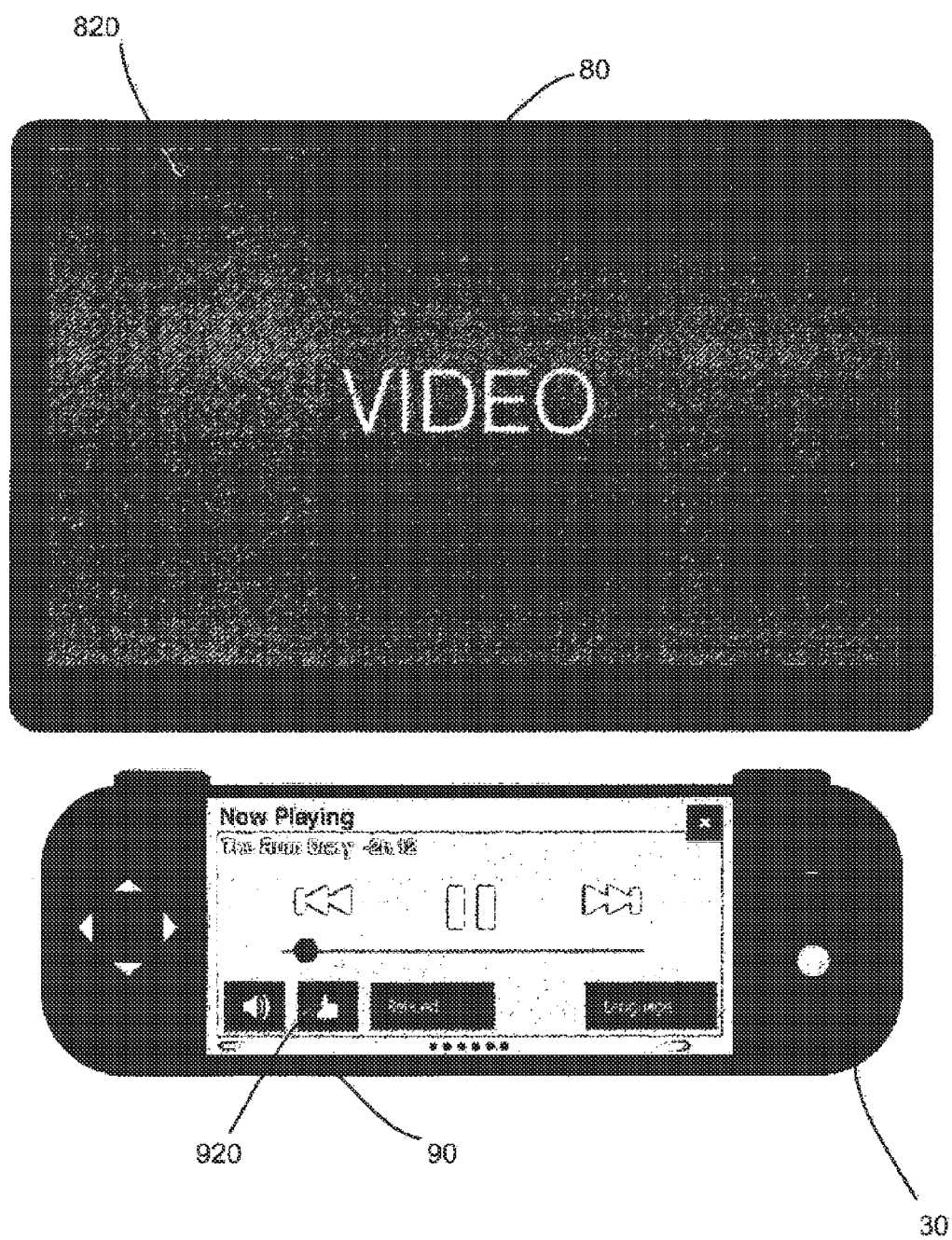

FIG. 6D illustrates that the contextual information 920 is changed to a "Now Playing" menu after the user performs a right to left swiping action on the touchscreen display 90.

Figure 6E:

FIG. 6E illustrates that the contextual information 920 is changed from a "Now Playing" menu to a "Flight Info" menu after the user performs another right to left swiping action on the touchscreen display 90.

Figure 6F:

FIG. 6F illustrates that the contextual information 920 is changed from a "Flight Info" menu to a "Notifications" menu after the user performs another right to left swiping action on the touchscreen display 90.

Figure 6G:

FIG. 6G illustrates that the contextual information 920 is changed from a "Notifications" menu to a "Dashboard" menu after the user performs another right to left swiping action on the touchscreen display 90.

Figure 6H:

FIG. 6H illustrates that the movie 820 stops playing after a user taps the touchscreen display 90 to pause the movie while the contextual information" is a "Dashboard" menu.

Figure 7A:
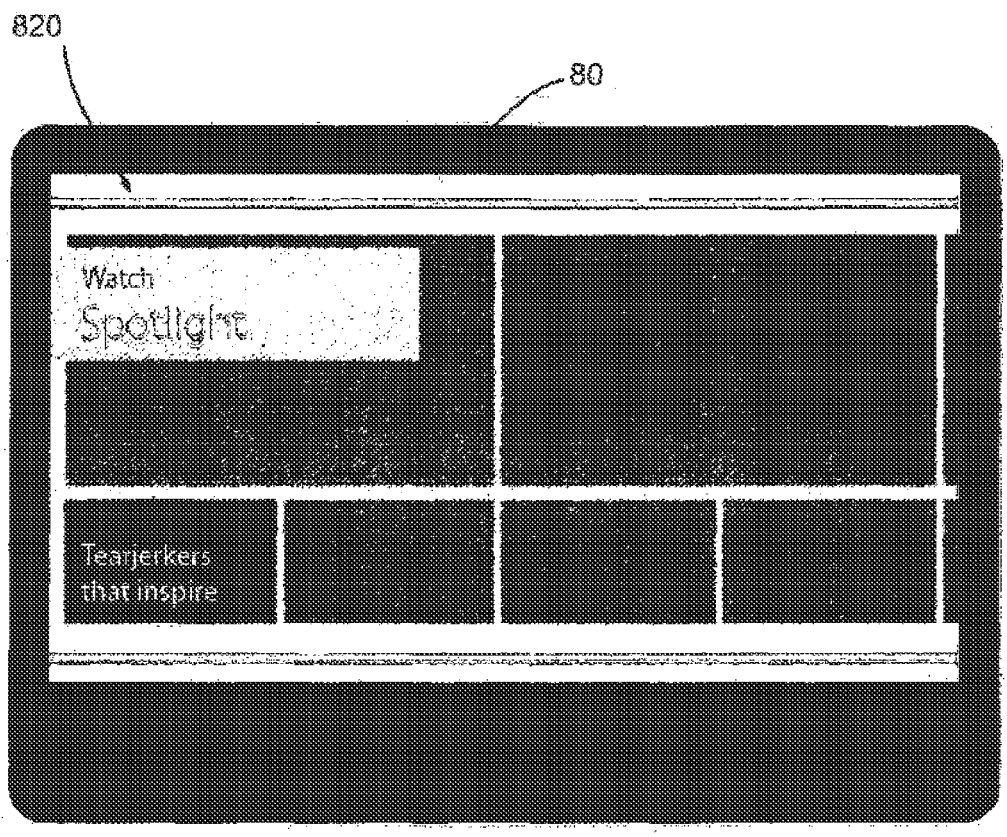
FIGS. 7A to 7C are screen mock-ups illustrating another series of content and contextual information.
Figure 7A:
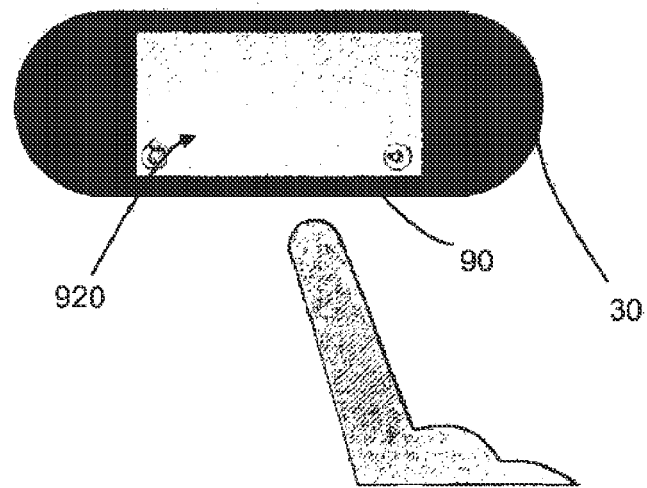

FIGS. 7A to 5C are screen mock-ups illustrating another series of contextual information 920 and content 820 when the control device 30 is being used by the user while the control device 30 is operating in the "Sequential" mode.

FIG. 7A illustrates the content 820 before a user touches the touchscreen display 90.

Figure 7B:
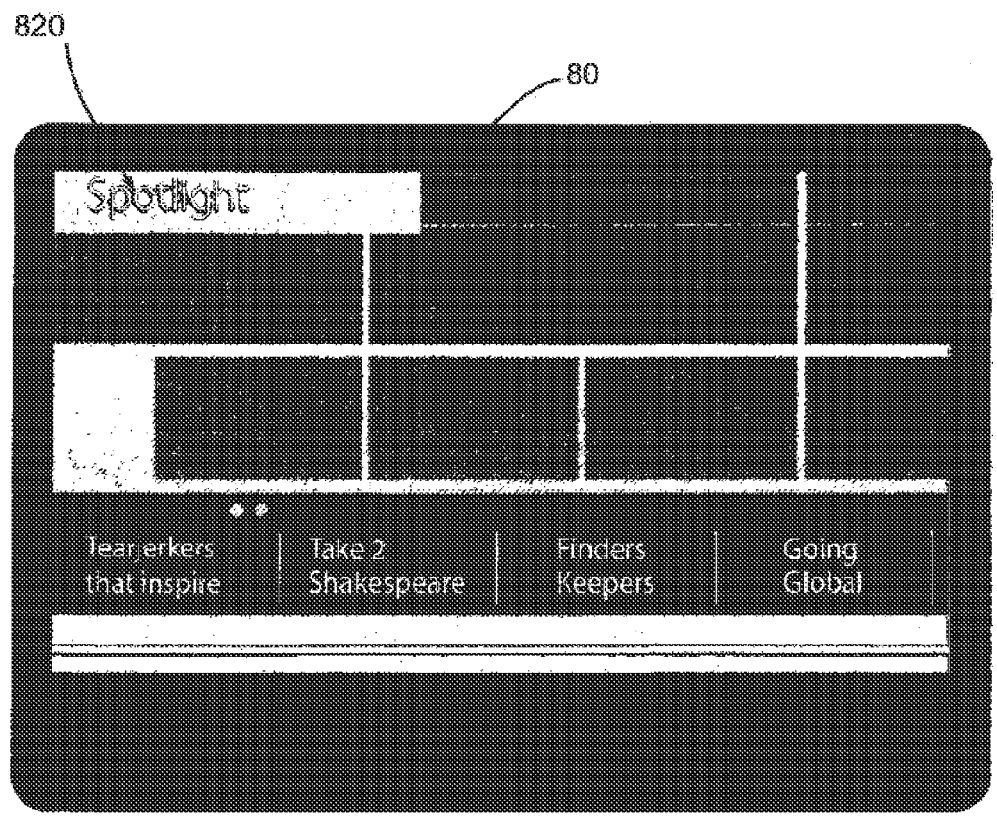
Figure 7B:
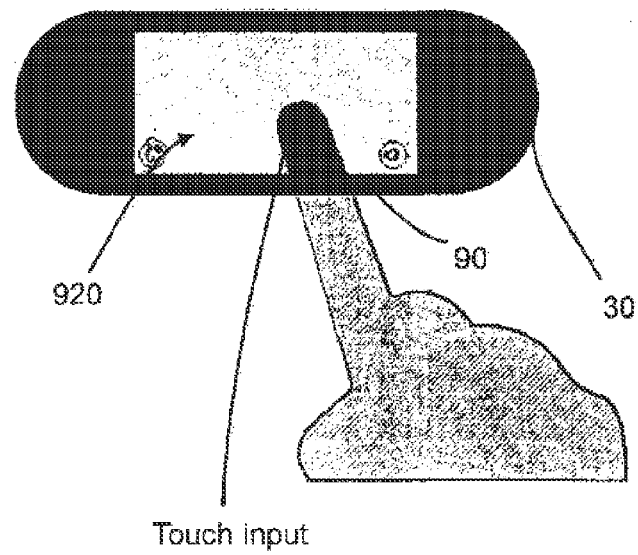

FIG. 7B illustrates that the content 820 changes to include additional selections (Take 2 Shakespeare, Finders Keepers, Going Global) after the user touches the touchscreen display 90. The content 820 reverts back to the format of FIG. 7A once the user disengages from the touchscreen display 90.

Figure 7C:
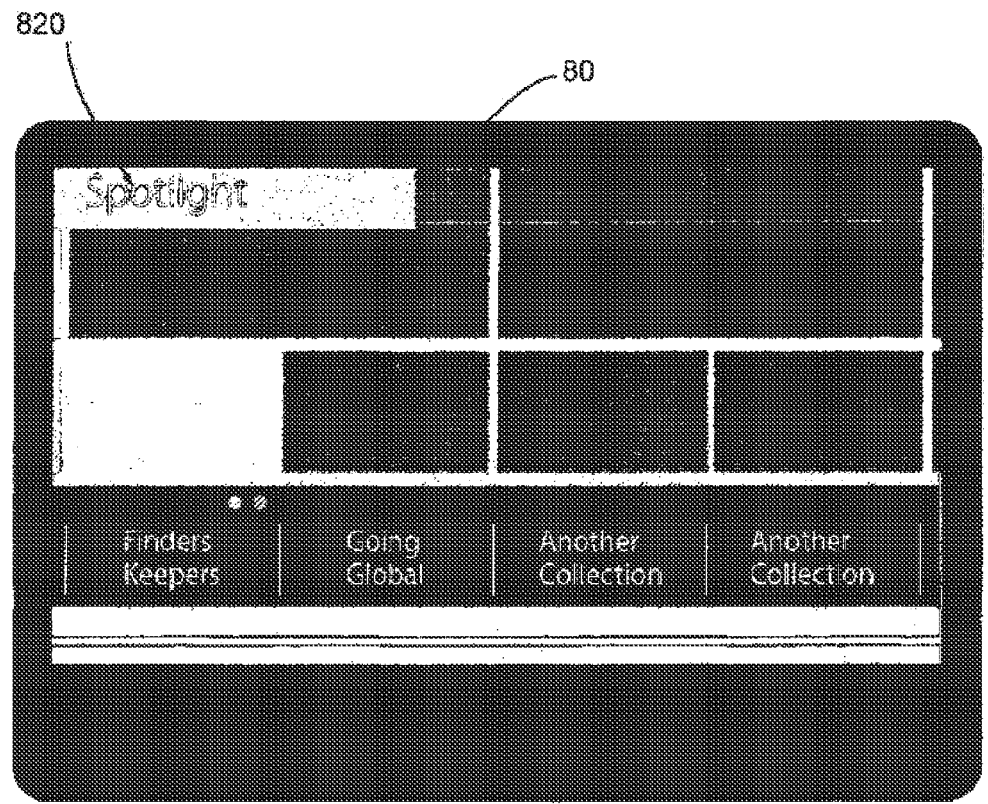
Figure 7C:
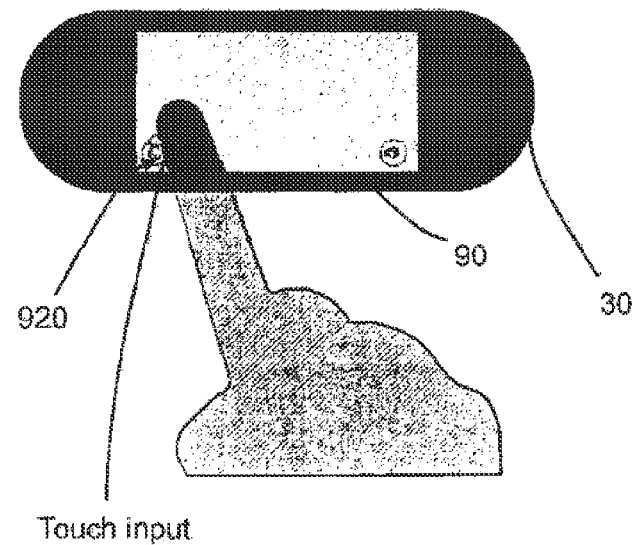

FIG. 7C illustrates the content 820 after the user carries out a right to left swiping action on the touchscreen display 90.

Figure 8A:
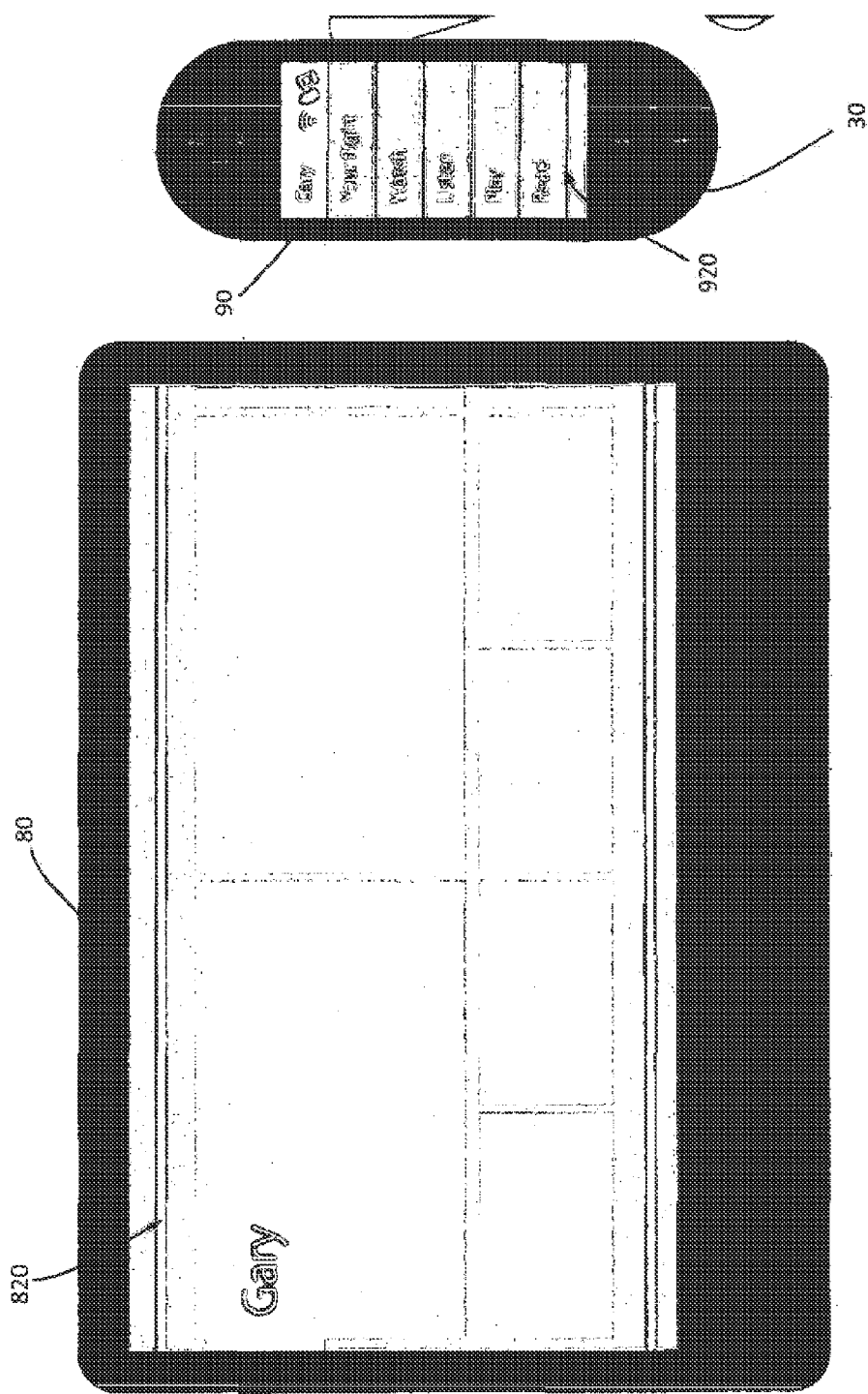
FIGS. 8A to 8E are screen mock-ups illustrating yet another series of content and contextual information.

FIGS. 8A to 6E are screen mock-ups illustrating a series of the contextual information 920 and content 820 when the control device 30 is being used by a user while the control device 30 is operating in the "Quick" mode.

FIG. 8A illustrates that the contextual information 920 is a navigation menu before a user touches the touchscreen display 90.

Figure 8B:
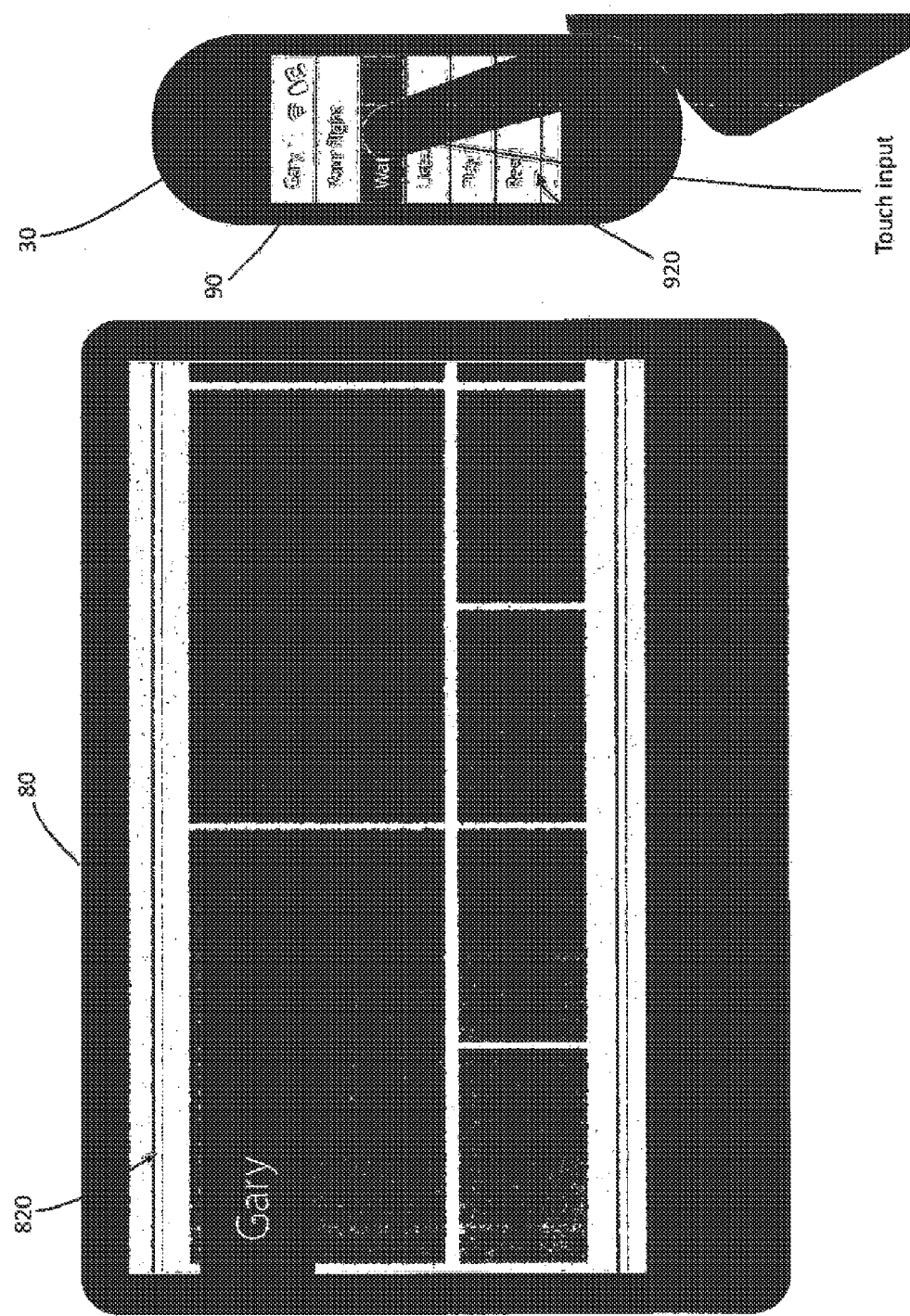

FIG. 8B illustrates that a portion of the contextual information 920 (Watch) is highlighted after the user touches the portion on the touchscreen display 90.

Figure 8C:
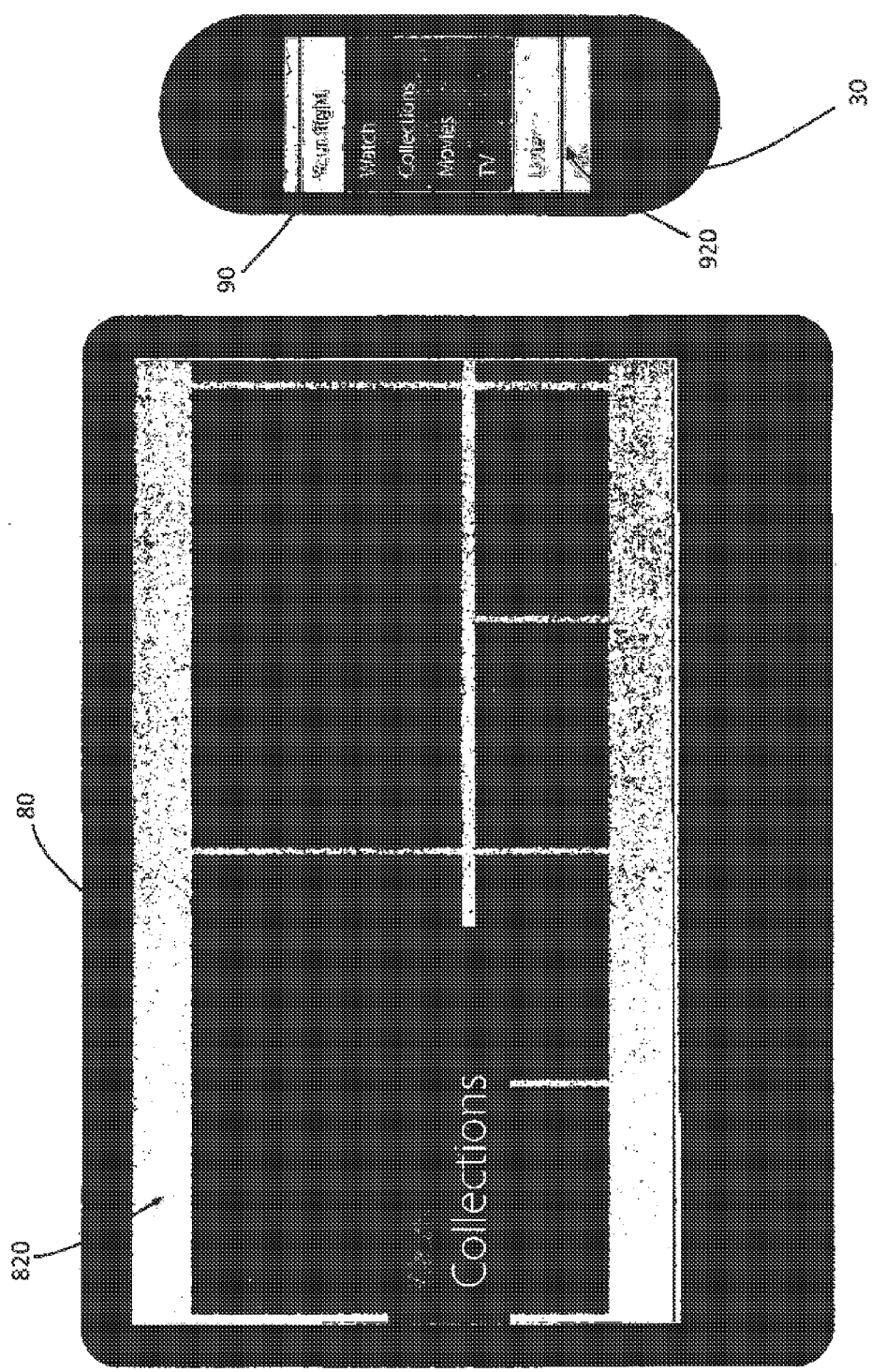

FIG. 8C illustrates that the contextual information 920 changes to include a secondary menu (Collections, Movies, TV) after the user touches the portion on the touchscreen display 90. The figure also illustrates that the content 820 is updated in synchrony with the change in the contextual information 920.

Figure 8D:
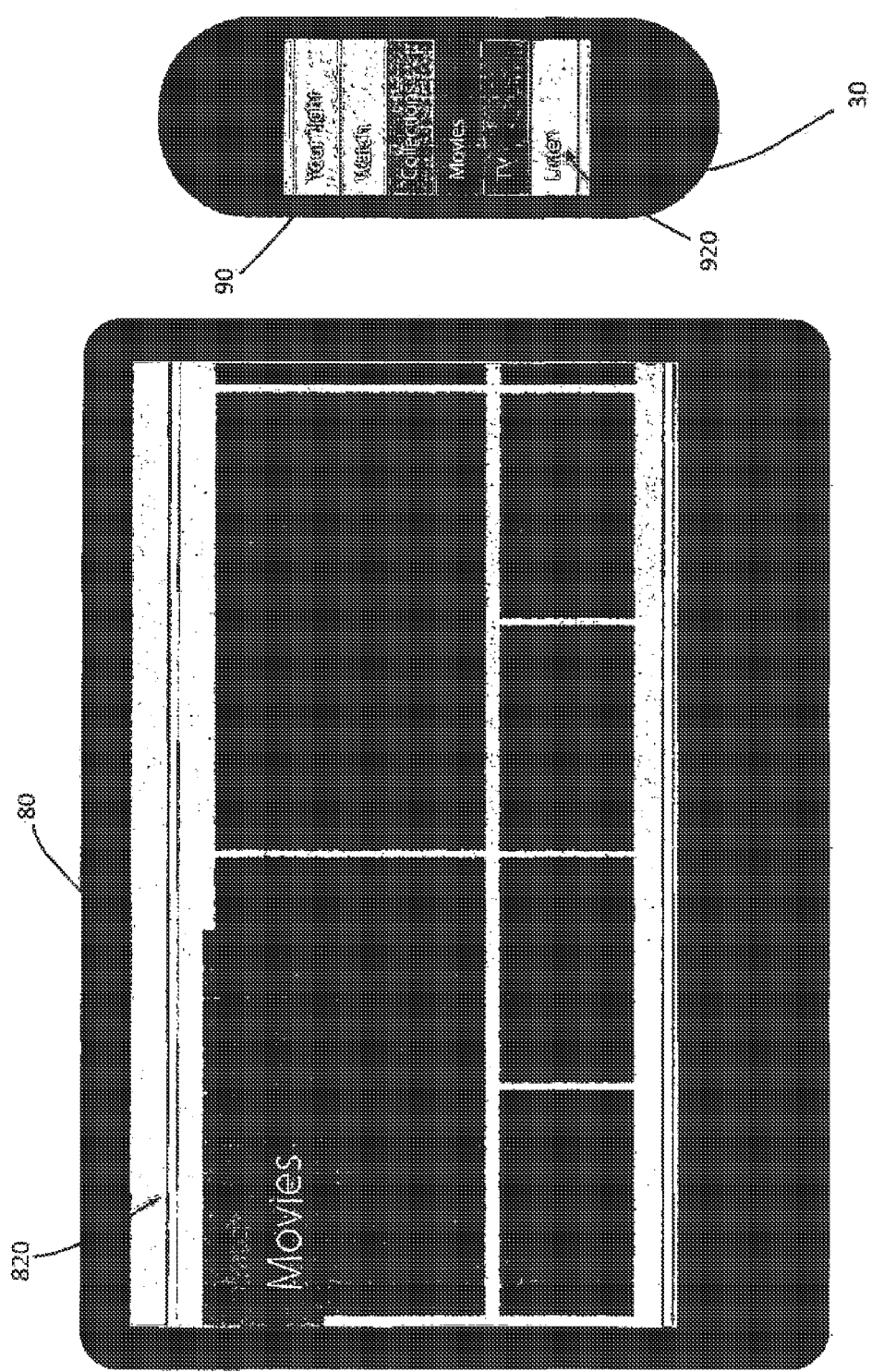

FIG. 8D illustrates that a portion of the secondary menu of the contextual information 920 (Movies) is highlighted after the user touches the portion on the touchscreen display 90. The figure also illustrates that the content 820 is updated in synchrony with the change in the contextual information 920.

Figure 8E:
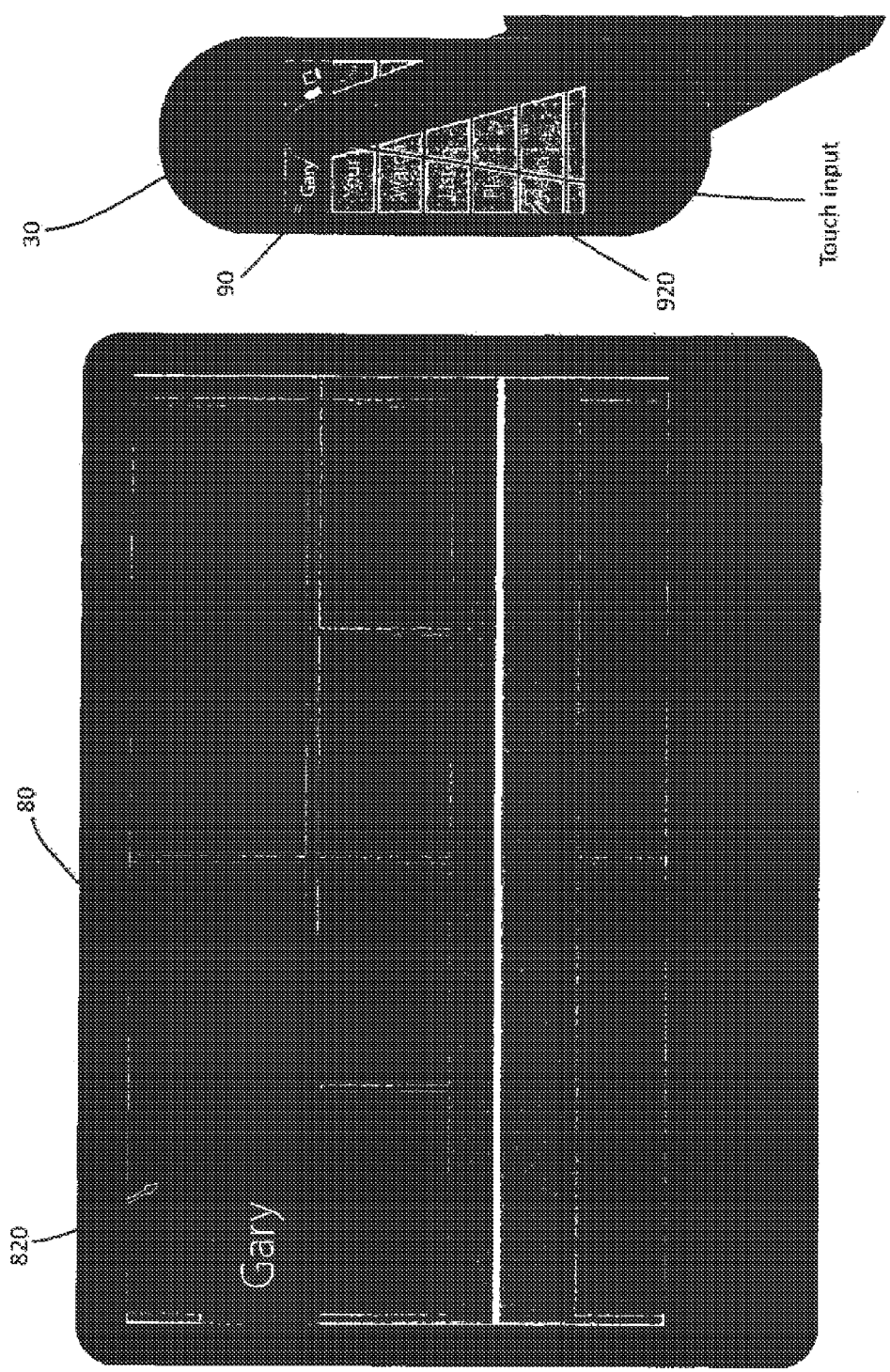

FIG. 8E illustrates that the contextual information 920 after the user performs an up to down swiping action followed by a tap action on a portion (Gary) of the touchscreen display 90.

It will be understood to persons skilled in the art of the invention that many modifications may be made without departing from the spirit and scope of the invention, in particular it will be apparent that certain features of embodiments of the invention can be employed to form further embodiments.

By way of example, it is noted that the "display" device and the "control" device may be described as a "primary" device and a "secondary" device, respectively, as indicating in general terms that the primary device is a major source of information (i.e. content) when compared to the secondary device.

It is to be understood that any reference to prior art made herein does not constitute an admission that the prior art forms or formed a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of controlling a display device of an in-flight entertainment system having a plurality of display devices and a plurality of corresponding control devices allocated to individual users, for displaying different content, wherein the control device is operable in three or more navigation modes and has a control device display, the method including:
- receiving at an individual control device a selection of a navigation mode for the individual control device;
- in response to a receipt of the selection of the navigation mode, generating at the individual control device a navigation menu in relation to content displayed by the corresponding display device of the in-flight entertainment system in a processor of the individual control device, the navigation menu comprising a number of shortcuts or links for changing the content displayed by the corresponding display device of the in-flight entertainment system; and
- displaying the navigation menu generated by the processor on the control device display of the individual control device to facilitate controlling the corresponding display device of the in-flight entertainment system,
- wherein the control device display is a touchscreen display that is responsive to a touch input, and the step of receiving the selection of the navigation mode for the control device includes providing the touch input to the touchscreen display,
- wherein the touch input is a swiping or dragging action close to a perimeter of the touchscreen display,
- wherein said three or more navigation modes of the control device comprise at least (1) a touch pad mode wherein the touchscreen display is responsive to touch inputs and the touchscreen display displays contextual information to facilitate controlling the display device of the in-flight entertainment system, and (2) a track pad mode where the touchscreen display is responsive to touch inputs but does not display information to facilitate controlling the display device,
- wherein said touch pad mode includes (a) a sequential mode, entered automatically when the control device is placed into a horizontal orientation and entered manually by left/right sweeping motion, and (b) a quick mode, entered automatically when the control device is placed into a vertical orientation and operative to display the contextual information as a navigation menu with links; and
- wherein in the sequential mode, the navigation menu comprises a portion of the content displayed by the display device of the in-flight entertainment system and the portion of the content displayed on the navigation menu and the display device of the in-flight entertainment system is changeable by the left/right sweeping motion touch input to the touchscreen display.

2. The method as claimed in claim 1, wherein the navigation menu is generated based on data received by the control device.

3. The method as claimed in claim 1, including controlling the control device to control the content displayed on the display device of the in-flight entertainment system.

4. The method as claimed in claim 3, wherein the step of controlling the control device includes changing the content displayed on the display device of the in-flight entertainment system.

5. The method as claimed in claim 4, including:
- generating contextual information in relation to new content displayed by the display device of the in-flight entertainment system; and
- displaying the contextual information in relation to the new content on the control device display of the control device.

6. The method as claimed in claim 1, wherein the control device display is a touchscreen display that is responsive to a touch input, and the step of controlling the control device includes providing the touch input to the touchscreen display to control the display device of the in-flight entertainment system.

7. The method as claimed in claim 1, including controlling the control device to control the navigation menu displayed on the control device display without changing the content displayed on the display.

8. The method as claimed in claim 1, wherein the control device comprises an orientation detection mechanism comprising at least one of a gyroscope, and accelerometer and an infrared detector.

9. The method as claimed in claim 1, wherein while the control device is operating in a first navigation mode, a touch input on a first perimeter of the touchscreen display causes the control device to switch to a second navigation mode, and a touch input on a second perimeter of the touchscreen display that is not the same as the first perimeter causes the control device to switch to a third navigation mode.

10. The method as claimed in claim 1, wherein the processor of the control device is in communication with and is operative to receive and control display on the touchscreen display of notifications.

11. A control device for controlling a display device of an in-flight entertainment system, having a plurality of display devices and a plurality of corresponding control devices allocated to individual users, for displaying different content, the control device being operable in three or more navigation modes and including:
- a processor configured to receive a selection of a navigation mode for the control device, and to generate a navigation menu in relation to content displayed by the corresponding display device of the in-flight entertainment system in response to a receipt of the selection of the navigation mode, the navigation menu comprising a number of shortcuts or links for changing the content displayed by the corresponding display device of the in-flight entertainment system; and
- a control device display for displaying the navigation menu generated by the processor to facilitate controlling the corresponding display device of the in-flight entertainment system,
- wherein the control device display is a touchscreen display that is responsive to a touch input, and the processor receives the selection of the navigation mode upon the touch input being provided to the touch screen display,
- wherein the touch input is a swiping or dragging action close to a perimeter of the touchscreen display,
- wherein said three or more navigation modes of the control device comprise at least (1) a touch pad mode wherein the touch screen display is responsive to touch inputs and the touch screen display displays contextual information to facilitate controlling the display device, and (2) a track pad mode where the touch screen display is responsive to touch inputs but does not display information to facilitate controlling the display device,
- wherein said touch pad mode includes (a) a sequential mode, entered automatically when the control device is placed into a horizontal orientation and entered manually by left/right sweeping motion, and (b) a quick mode, entered automatically when the control device is placed into a vertical orientation and operative to display the contextual information as a navigation menu with links, and wherein in the sequential mode, the navigation menu comprises a portion of the content displayed by the display device of the in-flight entertainment system and the portion of the content displayed on the navigation menu and the display device of the in-flight entertainment system is changeable by left/right sweeping motion touch input to the touch screen display.

12. The control device as claimed in claim 11, wherein the navigation menu is generated based on data received by the control device.

13. The control device as claimed in claim 11, wherein the control device is adapted to control the content displayed on the display device of the in-flight entertainment system.

14. The control device as claimed in claim 13, wherein the control device controls the content displayed on the display device of the in-flight entertainment system by changing the content displayed on the display device of the in-flight entertainment system.

15. The control device as claimed in claim 14, wherein the control device changes the content displayed on the display device of the in-flight entertainment system by:
generating contextual information in relation to new content displayed by the display device of the in-flight entertainment system; and
displaying the contextual information in relation to the new content on the control device display of the control device.

16. The control device as claimed in claim 11, wherein the control device is adapted to control the navigation menu displayed on the control device display without changing the content displayed on the display.

17. An in-flight entertainment system comprising a plurality of system units, each one of the system units comprising:
a touchscreen display for displaying content; and
a control device as claimed in claim 11.

18. The in-flight entertainment system as claimed in claim 17, wherein the control device comprises an orientation detection mechanism comprising at least one of a gyroscope, and accelerometer and an infrared detector.

19. The in-flight entertainment system as claimed in claim 17, wherein the processor of the control device is in communication with and is operative to receive and control display on the touchscreen display of notifications.

20. The control device as claimed in claim 11, wherein the control device comprises an orientation detection mechanism (50) comprising at least one of a gyroscope, and accelerometer and an infrared detector.

21. The control device as claimed in claim 11, wherein while the control device is operating in a first navigation mode, a touch input on a first perimeter of the touchscreen display causes the control device to switch to a second navigation mode, and a touch input on a second perimeter of the touchscreen display that is not the same as the first perimeter causes the control device to switch to a third navigation mode.

22. The control device as claimed in claim 11, wherein the processor of the control device is in communication with and is operative to receive and control display on the touchscreen display of notifications.

* * * * *

UNITED STATES PATENT AND TRADEMARK OFFICE
CERTIFICATE OF CORRECTION

| | |
|---|---|
| PATENT NO. | : 9,878,246 B2 |
| APPLICATION NO. | : 14/414472 |
| DATED | : January 30, 2018 |
| INVENTOR(S) | : Eng Seng Oh and Alexandra Williams |

It is certified that error appears in the above-identified patent and that said Letters Patent is hereby corrected as shown below:

In the Specification

Column 8, Line 67: Delete "30" and Insert -- 20 --

Column 9, Line 12: Delete "contact" and Insert -- control --

Column 11, Line 53: Delete "30" and Insert -- 300 --

Column 11, Line 61: Delete "300" and Insert -- 360 --

Column 13, Line 33: Delete "366" and Insert -- 666 --

Column 13, Line 34: Delete "360" and Insert -- 660 --

Column 14, Line 5: Delete "300" and Insert -- 600 --

Column 14, Line 55: Delete "540" and Insert -- 590 --

Column 14, Line 61: Delete "5A" and Insert -- 5B --

Column 15, Line 15: Delete "5B" and Insert -- 5A --

Column 16, Line 1: Delete "5C" and Insert -- 7C --

Column 16, Line 15: Delete "6E" and Insert -- 8E --

Signed and Sealed this
Twelfth Day of June, 2018

Andrei Iancu
*Director of the United States Patent and Trademark Office*